(12) United States Patent
Sako

(10) Patent No.: US 6,954,546 B2
(45) Date of Patent: Oct. 11, 2005

(54) IMAGE PROCESSING SYSTEM FOR PROCESSING PHOTOGRAPHING IMAGES

(75) Inventor: Tsukasa Sako, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 1007 days.

(21) Appl. No.: 09/729,346

(22) Filed: Dec. 5, 2000

(65) Prior Publication Data

US 2002/0006218 A1 Jan. 17, 2002

(30) Foreign Application Priority Data

Dec. 6, 1999 (JP) .......................................... 11-346224

(51) Int. Cl.⁷ ................................................ G06K 9/00
(52) U.S. Cl. ............. 382/132; 250/370.09; 250/390.02; 378/167
(58) Field of Search ................................ 382/128, 129, 382/130, 131, 132, 133, 134; 378/167, 18, 20, 108, 119; 250/370.09, 390.02, 330, 559.3, 370.9, 390.2, 475.2, 559.02; 600/109, 130, 447, 407, 443; 396/15, 17; 702/8, 40, 172, 378

(56) References Cited

U.S. PATENT DOCUMENTS

| | | | | |
|---|---|---|---|---|
| 5,123,056 A | * | 6/1992 | Wilson | 382/132 |
| 5,272,760 A | * | 12/1993 | Echerer et al. | 382/132 |
| 5,351,677 A | * | 10/1994 | Kami et al. | 600/109 |
| 5,644,611 A | * | 7/1997 | McShane et al. | 378/98 |
| 6,542,579 B1 | * | 4/2003 | Takasawa | 378/165 |
| 6,671,394 B1 | | 12/2003 | Sako | 382/132 |
| 6,714,623 B2 | | 3/2004 | Sako et al. | 378/98.8 |

FOREIGN PATENT DOCUMENTS

JP  7-111590  4/1995

OTHER PUBLICATIONS

U.S. Appl. No. 09/408,447, filed Sep. 29, 1999, Sako et al.

* cited by examiner

Primary Examiner—Kanjibhai Patel
Assistant Examiner—Abolfazl Tabatabai
(74) Attorney, Agent, or Firm—Fitzpatrick, Cella, Harper & Scinto

(57) ABSTRACT

Plural images photographed with an X-ray photographing system are consecutively input and plural photographing images of optional sizes are arranged in an output area. When the plural photographing images can not be arranged in the output area as a result of the arrangement, marginal portions of the photographing images are deleted on the basis of widths of photographing image arranging areas or a width of a runover image and the images are arranged once again. On the basis of a final arrangement result, the images are output to a laser imager or the like for printout on a film or the like.

36 Claims, 22 Drawing Sheets

FIG. 9

|  |  | FREQUENCY EMPHASIS PARAMETER VALUES | | | | |
|---|---|---|---|---|---|---|
|  |  | HARD | | | | SOFT |
| IMAGE COMPRESSION QUALITY | HIGH | NONE | 10 | 8 | 5 | 3 | 0 |
|  | 90 | 9 | 7 | 4 | 2 | 0 |
|  | 80 | 8 | 6 | 3 | 1 | 0 |
|  | 70 | 7 | 5 | 2 | 0 | 0 |
|  | 60 | 6 | 4 | 1 | 0 | 0 |
|  | LOW | 50 | 5 | 3 | 0 | 0 | 0 | though the above described object.

IMAGE PROCESSING SYSTEM FOR PROCESSING PHOTOGRAPHING IMAGES

BACKGROUND OF THE INVENTION

1. Field of the Invention

The present invention relates to an image processing system which processes digital images obtained by photographing with radiations such as X-rays, and more specifically a technology for consecutively arranging plural images within an area having a definite size.

2. Description of the Related Art

For X-ray photography in a medical field, it is conventional to first insert an unexposed film into a cassette and then set an object on the cassette. Next, an instructing operation is carried out for irradiating the object with X-rays. By this operation, the object is irradiated with X-rays emitted from an X-ray tube and the film in the cassette is exposed to the X-rays which have transmitted through the above described object.

In order to reduce an amount of the X-rays irradiating the object for a reason of humanity, an aperture of an X-ray diaphragm incorporated with the X-ray tube is controllable manually (by a user's command from a control unit) or automatically in accordance with a cassette size. Such a function is referred to as "autocollimation".

In addition to photography which obtains an X-ray photographing image in a cassette as a whole (an X-ray photographing image in a film area), there is carried out photography referred to as division photography which arranges plural X-ray photographing images within a film area.

For the division photography, half an area of a cassette (hereinafter referred to as an "A area") is first concealed with lead, an image is photographed on a rest half of a cassette (a region not concealed with lead to be hereinafter referred to as a "B area") and then an image is photographed in the A area which was concealed with lead while concealing the B area with lead. Accordingly, plural X-ray photographing images can be obtained in the cassette as a whole (plural X-ray photographing images in a film area).

On the other hand, there has recently been developed a technology for X-ray photography using sensors such as a solid-state image pickup device and along with the development of this technology, digital X-ray image photographic apparatuses which use computers have gradually been put to practical use.

The digital X-ray image photographic apparatus first receives X-rays having transmitted through an object with a sensor, thereby obtaining electric signals of the above described object. The photographic apparatus converts the electric signals into digital signals, thereby obtaining digital X-ray photographing image signals.

The digital X-ray photographing image signals thus obtained are processed with the computer and then visualized on a display or output to a film.

Since the sensor of the digital X-ray photographic apparatus has a fixed size, the digital X-ray photographing image signals obtained by photography have required information only in a field irradiated with X-rays.

Accordingly, the digital X-ray photographic apparatus arranges is capable of obtaining images similar to those obtained by the above described division photography (plural X-ray photographing images in a film area) by arranging images only in the above described irradiation field within an output area of a certain size. A processing for image arrangement can be performed with the above described computer. The digital X-ray photographic apparatus is capable of transferring a result of the above described processing to a display or a printer for output on the display or a film.

A method for arranging plural images within a definite output area (hereinafter referred to as a "method 1") is disclosed in Japanese Patent Application (Laid-Open) No. 7-111590 or the like.

The method 1 is a method which enlarges or contracts images at a step of arranging plural images within a definite area (output area).

Furthermore, another method (hereinafter referred to as a "method 2") is disclosed in U.S. Pat. No. 5,644,611 or the like.

The method 2 is a method which divides a frame into lines and rows on a display, and arranges areas in which radiation image information exists in divided formats (multiple formats) at a stage of arranging images when the radiation image information exists in certain areas and does not exist in other areas.

When plural images are to be consecutively arranged in an output area of a definite size by the method 1 or the method 2, it is more efficient from a view point of a cost as well as those of maintenance of films and images to arrange more images in the above described output area considering that the output area is finally output to a display or a film. In other words, an arrangement of more images in the output area makes it possible to reduce an amount of data to be taken into custody and managed by allowing a film or an image to be output in place of a large number of films or images to be output separately. Accordingly, such an arrangement of images is efficient from the viewpoints of the cost and the maintenance.

Even in a case where images are significant as X-ray photographing images but partial deletion of the images is judged as permissible to a certain degree, it may be effective to delete the images before arrangement.

Since the conventional method 1 is configured to enlarge or contract plural images for arrangement in the output area, an observer (a doctor or the like) observes the images in an enlarged or contracted condition when the output area is output to a display or a film for observation. In other words, the conventional method 1 does not allow the doctor to observe images a life size (a size which is not enlarged or contracted). This is seriously problematic for image diagnoses.

Speaking specifically of an actual medical field, for example, where image diagnoses are always carried out by comparison or the like with images of the life size, it is necessary to arrange each image of the life size without enlarging or contracting even when plural images are to be arranged consecutively in an output area of a definite size.

However, the conventional method 1 enlarges or contracts each image and arranges the image in the output area, thereby being fearful to constitute causes for erroneous diagnoses and highly problematic when the images in the output area are used for diagnoses.

Furthermore, the conventional method 2 is configured to always arrange the areas having the radiation image information of plural images in the multiple formats (output areas), thereby limiting a number of images to be arranged in the output areas.

That is, the conventional method 2 provides a result of frames which are divided at an equal aspect ratio and allocates an equal divided size to images even when images to be arranged have different areas which are to be displayed and effective for diagnosis, whereby some images have small areas effective for diagnoses and excessive blank areas, and are inefficient.

SUMMARY OF THE INVENTION

An object of the present invention is to provide an image processing system and a control method for the image processing system which correct the above described defect.

Another object of the present invention is to provide an image processing system and a control method for the image processing system which are capable of arranging more images efficiently in a condition convenient for observation at a step of consecutively arranging plural images in an output area of a definite size.

Still another object of the present invention is to provide an image processing system and a control method for the image processing system which permit efficiently using a screen of a display and a film.

Still another object of the present invention is to provide an image processing system and a control method for the image processing system which permit efficient diagnoses of photographed radiation images and are capable of preventing erroneous diagnoses as far as possible.

Other objects of the present invention will be apparent from description which are made below with reference to the accompanying drawings and claims.

BRIEF DESCRIPTION OF THE DRAWINGS

FIG. 9 is a diagram descriptive of a table of parameter values in the frequency emphasis processing of quality values for the compression processing;

DETAILED DESCRIPTION OF THE PREFERRED EMBODIMENTS

Now, the preferred embodiments of the present invention will be described with reference to the accompanying drawings.

Figure 1:
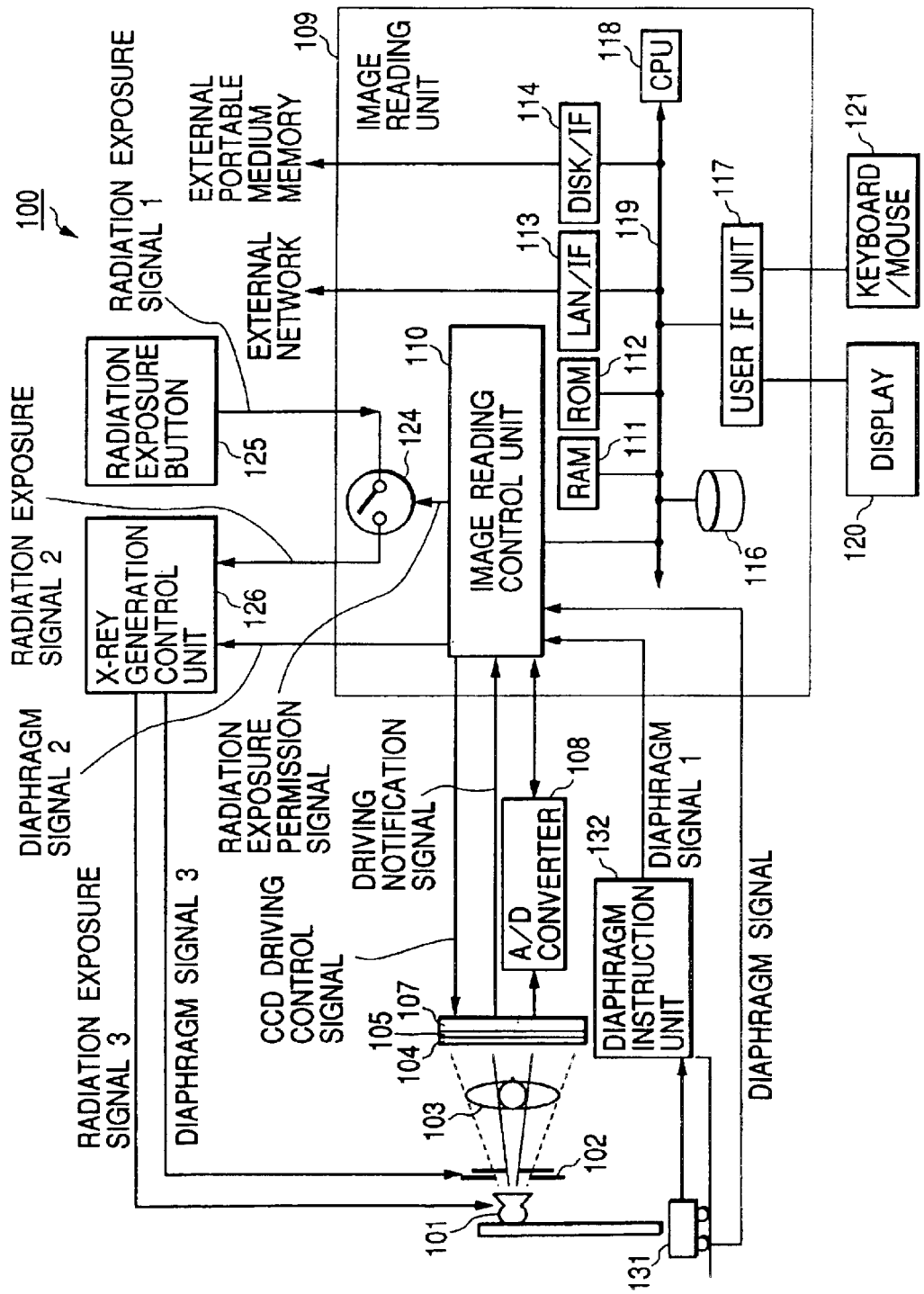
FIG. 1 is a block diagram showing a configuration of an X-ray image photographic system to which the present invention is applied.

The present invention is applied, for example, to an X-ray image photographic system 100 shown in FIG. 1.

This X-ray image photographic system 100 comprises an X-ray tube 101 emitting X-rays, an X-ray diaphragm 102 for the X-ray tube 101, a CCD 107 on which X-rays are incident from the X-ray tube 101, a grid 104 and a scintillator 105 which are disposed between the X-ray tube 101 and the CCD 107, an A/D converter 108 which converts an output from the CCD 107 into a digital signal and outputs the signal as an X-ray photographing image signal, an image reading unit 109 which performs a predetermined processing of the X photographing image signal from the A/D converter 108 and provides a screen display output, an X-ray generation control unit 126 which controls generation of the X-rays by the X-ray tube 101, a distance measurement unit 131 which measures a distance between the X-ray tube 101 and the CCD 107, and a diaphragm instruction unit 132 which adjusts an aperture of the X-ray diaphragm 102.

The image reading unit 109 is configured so that data is transferred by way of a bus 119 mutually among an image reading control unit 110 which controls the CCD 107, the X-ray generation control unit 126 or the like, a RAM 111 which stores various kinds of data and is used also for works, a ROM 112 which stores various kinds of processing programs to be executed by the X-ray image photographic apparatus 100, an LAN/IF 113 which is an interface unit for an external network (an "LAN" in this case), a DISK/IF 114 which is an interface unit for an external portable memory device, a non-volatile memory unit 116 such as a hard disk, a user interface (IF) unit 117, and a CPU 118 which governs operation control of the X-ray image photographic apparatus 100 as a whole executing the processing programs of the ROM 112 or the like.

An exposure button 125 is disposed on the image reading unit 109 and an output from the exposure button 125 is supplied to the X-ray generation control unit 126 under switching control of an exposure permission switch 124 with the image reading control unit 110.

Connected to the user IF unit 117 are a display 120 such as a CRT and an operation unit 121 such as a keyboard/ mouse.

[With Respect to Series of Operations of X-Ray Image Photographic System 100]

First, an operator disposes an object 103 to be photographed between the CCD 107 and the X-ray tube 101.

Then, the operator makes preparations for photography by using the user interface 117. For example, the operator selects a location of the object 103 which is to be photographed.

When the above described preparations have been completed by the operator, the image reading control unit 110 applies a voltage to the CCD 107 by using a CCD driving control signal, thereby preparing the CCD 107 in a condition ready for an input of an image of the object 103 at any time (condition to image X-rays from the X-ray tube 101).

Then, the operator moves the X-ray tube 101 to a location appropriate for the CCD 107.

At this time, the distance measurement unit 131 measures a distance from the X-ray tube 101 to the CCD 107 and a measured distance is supplied as a distance signal to the image reading control unit 110.

Then, the operator adjusts an aperture of the X-ray diaphragm 102 with a diaphragm instruction unit 132 so that the location of the object 103 to be photographed is located within a photographing area.

By this operation, the image reading control unit 110 supplies a diaphragm signal 2 to the X-ray generation control unit 126 on the basis of a diaphragm aperture adjustment instruction from the operator (a diaphragm signal 1 from the diaphragm instruction unit 132). On the basis of the diaphragm signal 2 from the image reading control unit 110, the X-ray generation control unit 126 supplied a diaphragm signal 3 to the X-ray diaphragm 102. The X-ray diaphragm 102 is opened or closed accordingly.

The X-ray diaphragm 102 is rectangular and has an aperture which is adjustable in both vertical and horizontal directions by the diaphragm signal 3.

It can not be known whether or not X-rays are projected within an appropriate range through the X-ray diaphragm 102 without actual projection of X-rays and the operator may be exposed excessively to X-rays. To prevent such exposure, the X-ray image photographic apparatus 100 is configured to permits confirming whether or not a projection field is appropriate (whether or not the X-ray diaphragm 102 is appropriately adjusted) by preliminarily projecting an illumination rays through a path equal to that for X-rays.

Then, the operator manipulates the exposure button 125. This exposure button 125 is a trigger for generating X-rays from the X-ray tube 101 and generates an exposure signal 1 when manipulated (depressed) by the operator.

The exposure signal 1 generated from the exposure button 125 is supplied once to the image reading control unit 110.

Upon receiving the exposure signal 1, the image reading control unit 110 generates an exposure permission signal to a exposure permission switch 124 after confirming whether or not the CCD 107 is in the condition ready for imaging X-rays from the X-ray tube 101 dependently on a state of a driving information signal generated from the CCD 107. This exposure permission signal turns on the exposure permission switch 124, thereby making the exposure signal 1 generated by the exposure button 125 conductive to an exposure signal 2 to the X-ray generation control unit 126.

The exposure signal 2 uses a switch of the exposure button 125 which is referred to as a second switch.

According to the exposure signal 2 which is generated as described above, the X-ray generation control unit 126 generates an exposure signal 3 to the X-ray tube 101 immediately after the X-ray tube 101 is ready for generating X-rays.

The X-ray tube 101 generates X-rays accordingly. These X-rays transmit through the object 103, the grid 104 and the scintillator 105 consecutively, and are imaged on the CCD 107 as rays having transmitted through the object 103. By photoelectric conversion by the CCD 107, the X-rays are output as an image signal (X-ray photographing image signal). This X-ray photographing image signal is converted by the A/D converter 108 into a digital signal and supplied to the image reading unit 109.

The image reading unit 109 develops the X-ray photographing image signal from the A/O converter 108 once on the RAM 111, performs various processings with the image reading control unit 110 as described later, displays the processed X-ray photographing image signal on a screen of the display 120 or outputs the processed signal to a film through a printer (not shown).

[Outline of Processing Members in Image Reading Control Unit 110]

Figure 2:
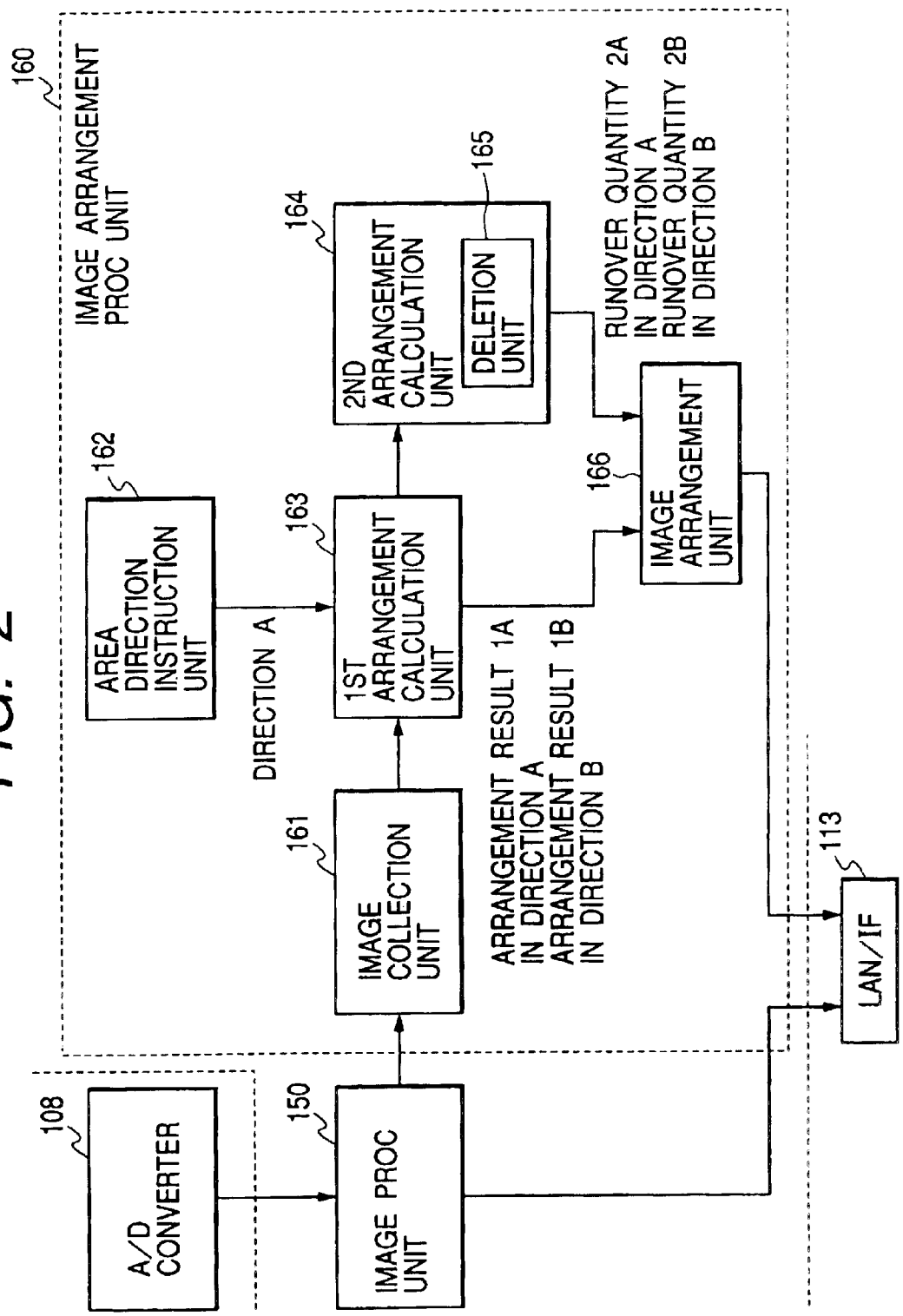
FIG. 2 is a block diagram showing a configuration of main members of the X-ray image photographic system.

The image reading control unit 110 has a configuration shown in FIG. 2 in particular.

The image reading control unit 110 has functions to arrange plural X-ray photographing images of various sizes consecutively from a left upside to a right downside in an output area of a definite size, and comprises an image processing unit 150 and an image arrangement processing unit 160 as shown in FIG. 2.

The image arrangement processing unit 160 comprises an image collection unit 161, an area direction instruction unit 162, a first arrangement calculation unit 163, a second arrangement calculation unit 164 having a deletion unit 165 and an image arrangement unit 166.

The image processing unit 150 performs various image processings of the X-ray photographing image from the A/D converter 108.

The image collection unit 161 collects plural X-ray photographing images processed by the image processing unit 150 in a group.

The area direction instruction unit 162 inputs information of a vertical or horizontal direction of the output area in which the plural images are arranged according to an instruction from the CPU 118.

This is because the output area is generally rectangular, for example, when an output destination of the output area is a film. Accordingly, the area direction instruction unit 162 is capable of inputting information of a horizontal disposition or a vertical disposition of the film which is the output destination of the output area.

The first arrangement calculation unit 163 arranges the plural images in the output area in a direction according to an instruction from the arrangement direction instruction unit 162 (hereinafter referred to as a "default direction A"). An arrangement result is shown as "1A".

Furthermore, the first arrangement calculation unit 163 arranges the plural images in the output area in a direction reverse (hereinafter referred to as a "direction B") to that according to the instruction from the area direction instruction unit 162 (default direction A). This arrangement result is shown as "1B".

When images run over the area in the arrangement results (arrangement result 1A in the direction A and arrangement result 1B in the direction B) obtained with the first arrangement calculation unit 163, the second arrangement calculation unit 164 calculates a runover quantity 2A in the arrangement result 1A and a runover quantity 2B in the arrangement result 1B, and on the basis of the runover quantities 2A and 2B the deletion unit 165 deletes marginal portions corresponding to widths of the plural images, thereby rearranging the images so as to be within the output area.

The image arrangement unit 166 determines an efficient image arrangement on the basis of the arrangement results 1A and 1B obtained with the first arrangement calculation unit 152 and the runover quantities 2A and 2B obtained with the second arrangement calculation unit 153, and actually arranges the images according to a determined result.

Figure 3:
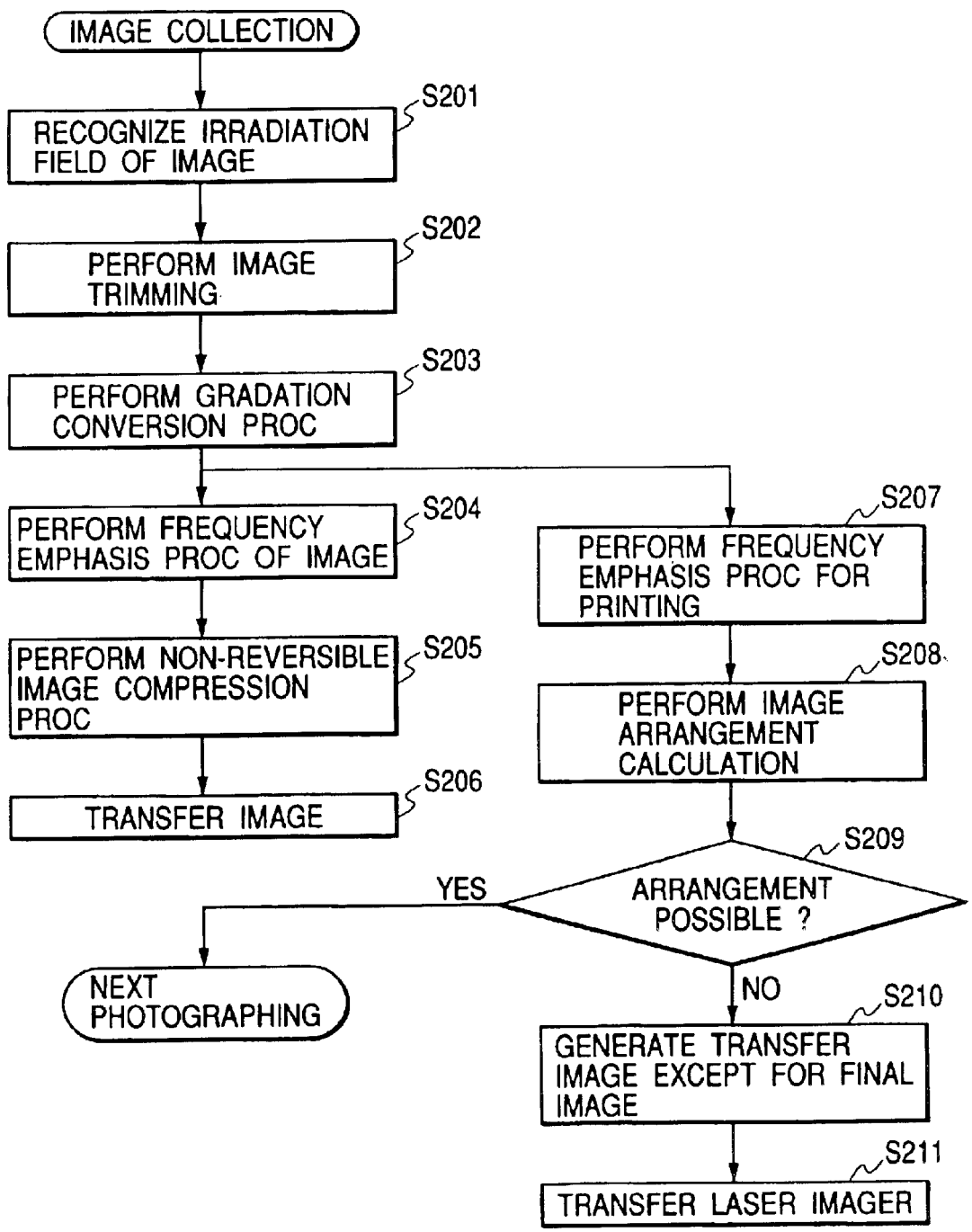
FIG. 3 is a flow chart descriptive of operations of the X-ray image photographic system as a whole.

FIG. 3 is a flow chart showing processings to be executed by the image reading control unit 110.

When a processing program is preliminarily stored in the ROM 112 and the CPU 118 reads out and executes the program, for example, the image reading control unit 110 operates as described below.

First, the image processing unit 150 inputs the X-ray photographing image from the A/D converter 108 and recognizes an irradiation area (an irradiation field area) of the X-ray photographing image (step S201).

Then, the image processing unit 150 performs trimming of the X-ray photographing image on the basis of irradiation field recognition and a recognition result (step S202).

Next, the image processing unit 150 performs a gradation conversion processing of the X-ray photographing image after trimming (trimmed image) (step S203).

The image processing unit 150 performs a frequency emphasis processing (step S204) and a non-reversible compression processing (step S205) of the X-ray photographing image after the gradation conversion processing, and image transfer through the LAN/IF 113 (network transfer) (step S206). When it is necessary to transfer the X-ray photographing image after the gradation conversion processing to a laser imager or a printer for a film (a film on a printer in this case) as the network transfer, the image processing unit 150 first performs a frequency emphasis processing for printing of the X-ray photographing image after the gradation conversion processing (step S207). The compression processing is not performed at this step.

Then, the image processing unit 160 arranges plural X-ray photographing images which are subjected to the frequency emphasis processing by the image processing unit 150 within a printable output area (steps S208 and S209), reforms images to output for printing (step S210) and transfers the images to the printer (step S211).

Specific description will be made below of the above described steps S201 to S211.

Step S201: Irradiation Area Recognition

First, the image processing unit 150 calculates a width and a height of an irradiation area of the CCD 107 from the distance signal from the distance measurement unit 131 and the diaphragm signal 1 from the diaphragm instruction unit 132 as described below.

Figure 4:
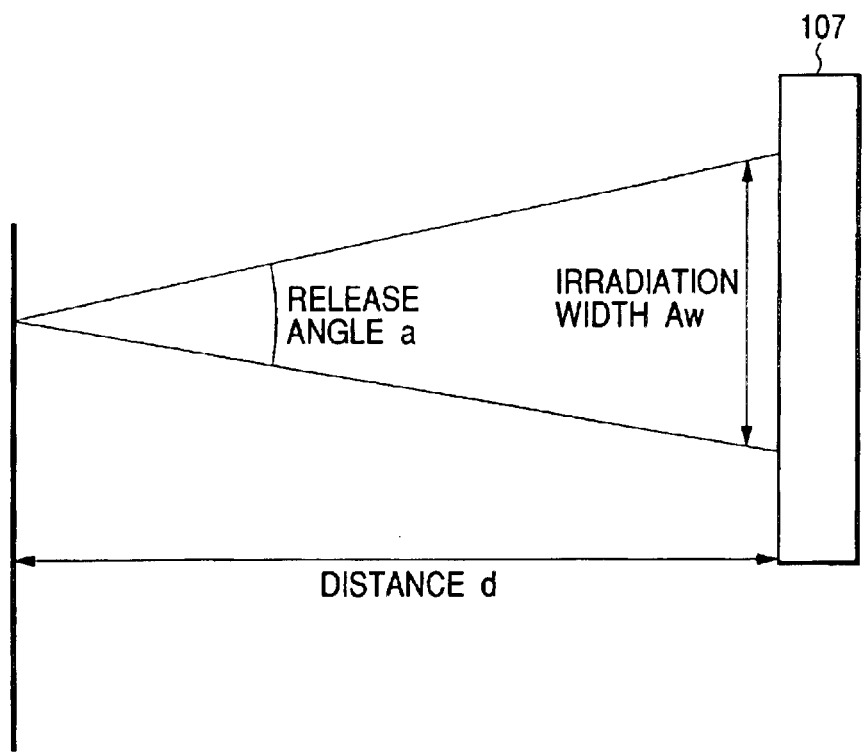
FIG. 4 is a diagram descriptive of a processing for extracting an irradiation area from an X-ray photographing image.

To adjust an aperture with the diaphragm instruction unit 132, an aperture instruction (the diaphragm signal 1) is indicated as a release angle a for irradiating the CCD 107 with X-rays from the X-ray tube 101 as shown in FIG. 4. Furthermore, a distance (a distance signal) between the CCD 107 and the X-ray tube 101 is indicated as a distance d as shown in FIG. 4.

Accordingly, a width Aw of the irradiation area (irradiation width) of the CCD 107 is calculated by the formula (1):

$$Aw = d * \tan(a/2) \tag{1}$$

Furthermore, a horizontal width Iw of the irradiation area for an image obtained with the CCD 107 (specifically, the above described image signal which is converted into a digital X-ray photographing image signal) is calculated by the following formula (2):

$$\begin{aligned} Iw &= Aw/p/d \\ &= d * \tan(a/2)/p \end{aligned} \tag{2}$$

wherein "p" denotes an element pitch size on the CCD 107 by setting a pixel of the irradiation area as a unit.

A height of the irradiation area (irradiation height) Ih is calculated similarly to the above described horizontal width Iw.

Though the above described embodiment is configured to automatically measure the distance d between the CCD 107 and the X-ray tube 101 with the distance measurement unit 131, the embodiment is not limitative and a default value corresponding to a location to be photographed may be used, for example, when the operator selects the location to be photographed of the object 103. This is because a fixed value corresponding to a location to be photographed is used as a value of the distance d between the CCD 107 and the X-ray tube 101 for ordinary X-ray photography.

Then, the image processing unit 150 extracts left and right irradiation ends of the X-ray photographing image from the A/D converter 108 as described below.

Figure 5:
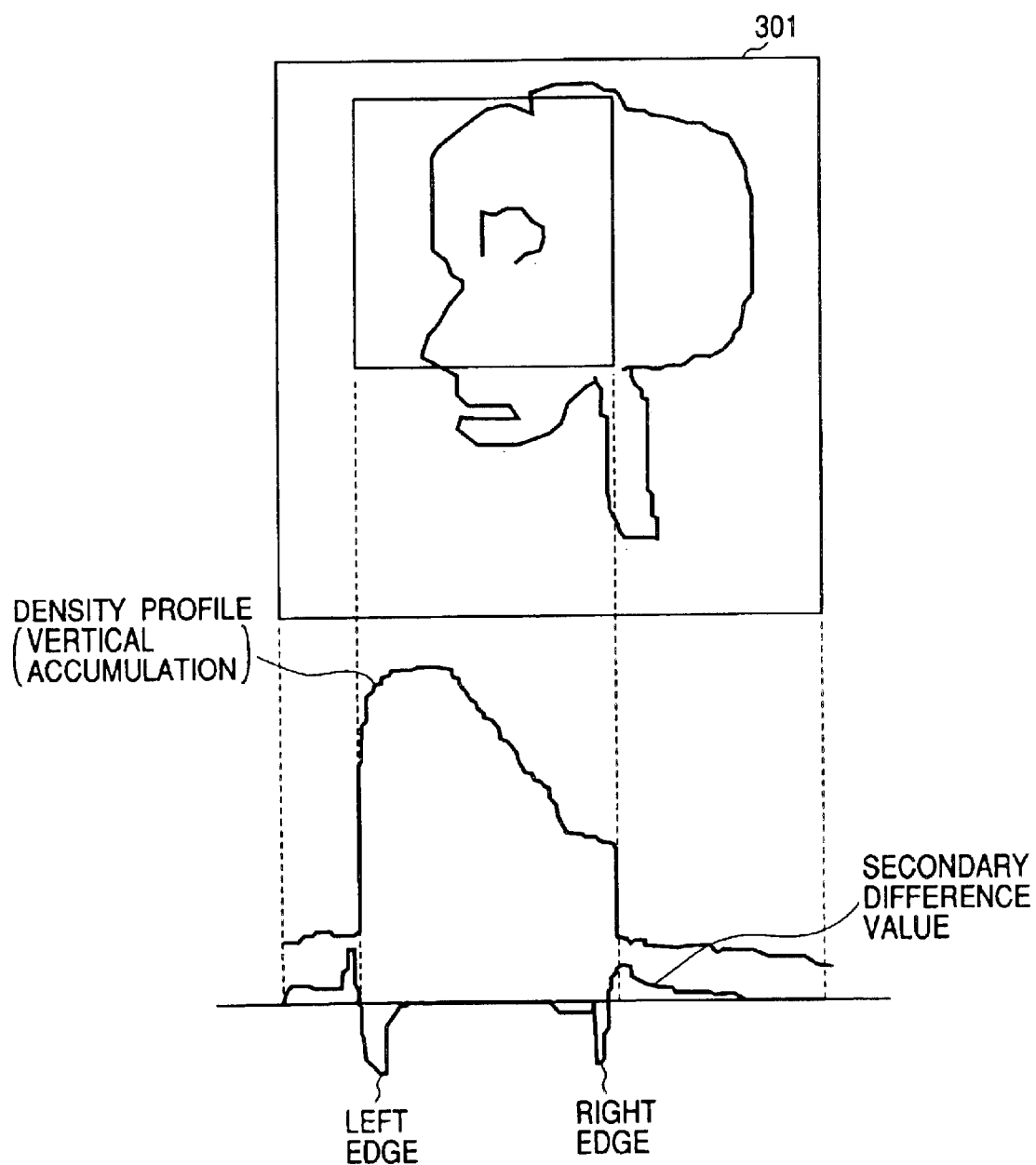
FIG. 5 is a diagram descriptive of a processing for extracting left and right edge points of the irradiation area.

By a method disclosed by Japanese Patent Application Laid-Open No. 10-243020 or the like, the image processing unit 150 creates a density profile in the vertical direction of an X-ray photographing image 301 and smoothes the density profile with a one-dimensional morphology filter as shown in FIG. 5. Then, the image processing unit 150 determines left and right edges of the irradiation area by calculating a secondary difference value SS(x) of a smoothed image (one-dimensional image density value S(x)) according to the following formulae (3) to (5):

$$SS(x) = S(x-c) - 2 \times S(x) + S(x+c) \tag{3}$$

$$\text{Left edge} = \min\{SS(x)|0 \leq x \leq \text{Length}/2\} \tag{4}$$

$$\text{Right edge} = \min\{SS(x)|\text{Length}/2 \leq x \leq \text{Length}\} \tag{5}$$

wherein "c" denotes a predetermined fixed length (for example, 3 pixels) and "length" denotes a horizontal width of the image (pixels).

Figure 6:
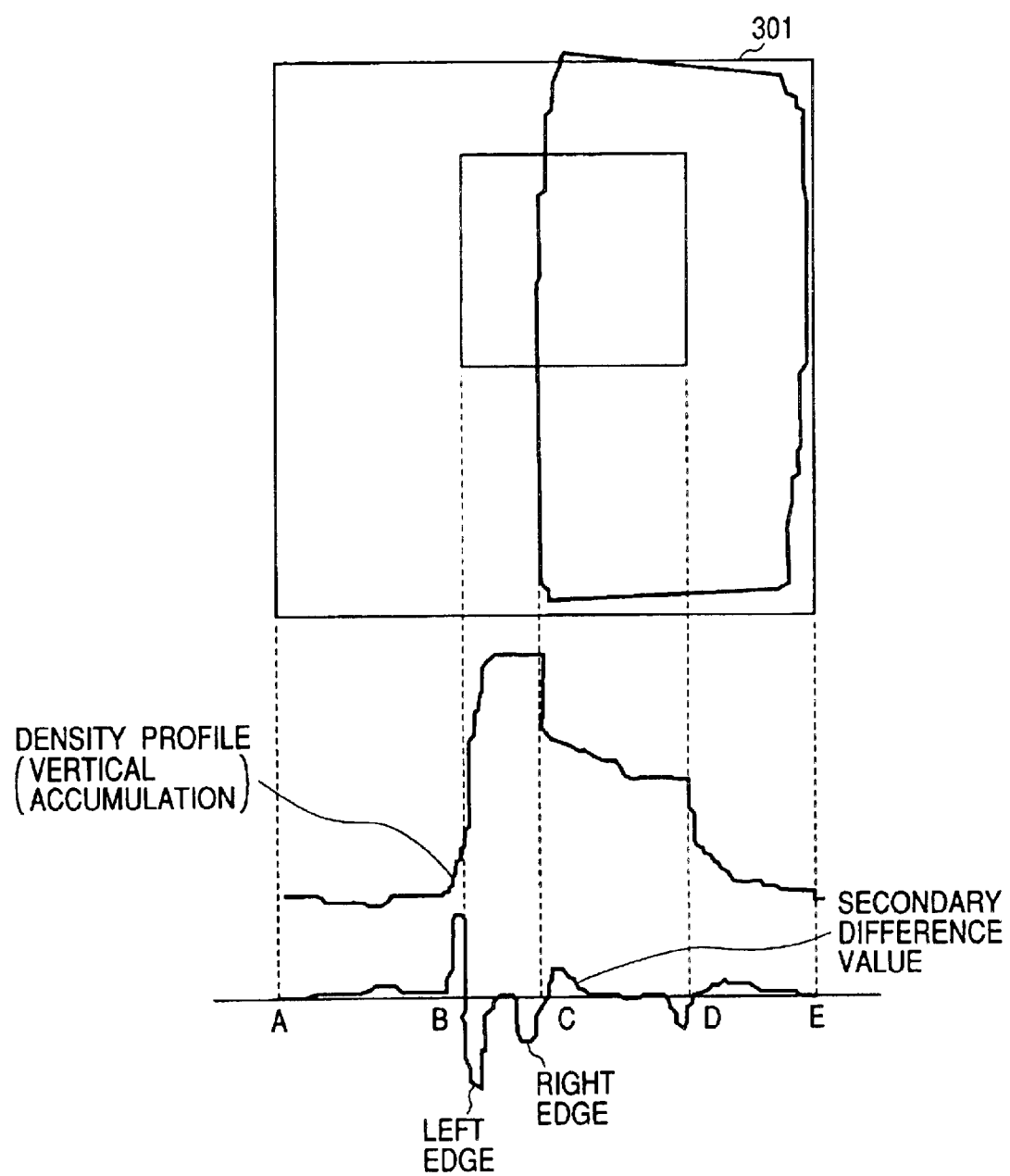
FIG. 6 is a diagram descriptive of a processing for extracting the left and right edge points in a case where extraction of the irradiation area is failed.

When secondary difference values SS(x) shown in FIG. 6 are obtained (when a calculation of an irradiation edge fails), an edge point of the irradiation area is calculated using, in place of the above described formulae (4) and (5), the following formula (6):

$$\text{Edge point} = \min\{SS(x)|0 \leq x \leq \text{Length}\} \tag{6}$$

The edge point calculated by the formula (6) is determined as a left edge point of the irradiation area in a case where a density is low on a left side of the edge point and a density is high on a right side, or the above described edge point is determined as a right edge point of the irradiation area when a density is high on the left side of the edge point and a density is low on the right side of the edge point.

Specifically, as shown in FIG. 6, a point B which has a minimum value out of points A to E having secondary difference values SS(x) is calculated by the formula (6) as an edge point and since a density is low on the left side of the edge point B and a density is high on the right side, the edge point B is determined as a left edge point.

Using a coordinate a at the edge point, the above described edge point is judged as the left edge point when the one-dimensional image concentration value S(x) satisfies a formula (7) shown below which indicates a density high on the right side:

$$S(a-c) \leq S(a+c) \quad (7)$$

or the above described edge point is judged as the right edge point when the one-dimensional image concentration value S(x) satisfies a formula (8) shown below which indicates a density high on the left side:

$$S(a-c) > S(a+c) \quad (8)$$

Figure 7:
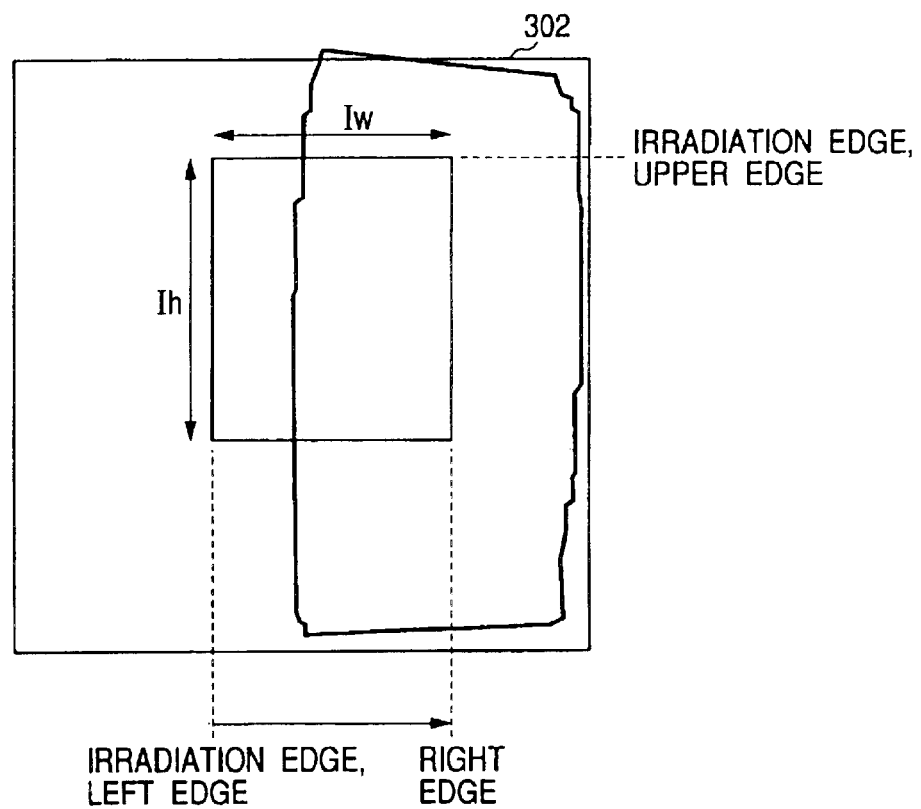
FIG. 7 is a diagram descriptive of a processing for extracting the irradiation area from the left and right edge points.

When either of the left and right edge points of the irradiation area is determined as described above (it is assumed that the left edge point B is obtained), a point which is located rightward from the left end point B for a distance of Iw pixels is determined as a right edge point since a width of the rectangular irradiation area is known from the horizontal width Iw of the irradiation area obtained by the above described formula (2) as shown in FIG. 7.

When the point located rightward for the distance of Iw pixels runs over a sensor area at this time, a runover area is ignored.

When a right edge point is obtained by the formulae (6) to (8), a left edge point may be determined as a point which is located leftward from the right edge point for the distance of the Iw pixels.

Edge points of the irradiation area in the vertical direction are determined similarly to the above described left and right edge points.

Step S202: Image Trimming

When the image processing unit 150 recognizes the irradiation area for the X-ray photographing image at the step S201, the image processing unit 150 trims an image shown in the irradiation area and generates a new image having a width Iw and a height Ih (image shown only in the irradiation area hereinafter referred to as a "trimmed image").

Step S203: Gradation Conversion Processing

The image processing unit 150 extracts a characteristic quantity from the trimmed image generated at the step S202, for example, and performs a gradation conversion processing of the above described trimmed image using the characteristic quantity.

Step S204: Frequency Emphasis Processing of Image

Step S205: Non-reversible Image Compression Processing

The image processing unit 150 performs a frequency emphasis processing of the trimmed image after the gradation conversion processing at the step S203 and then a non-reversible image compression processing, for example, according to JPEG code.

Figure 8:
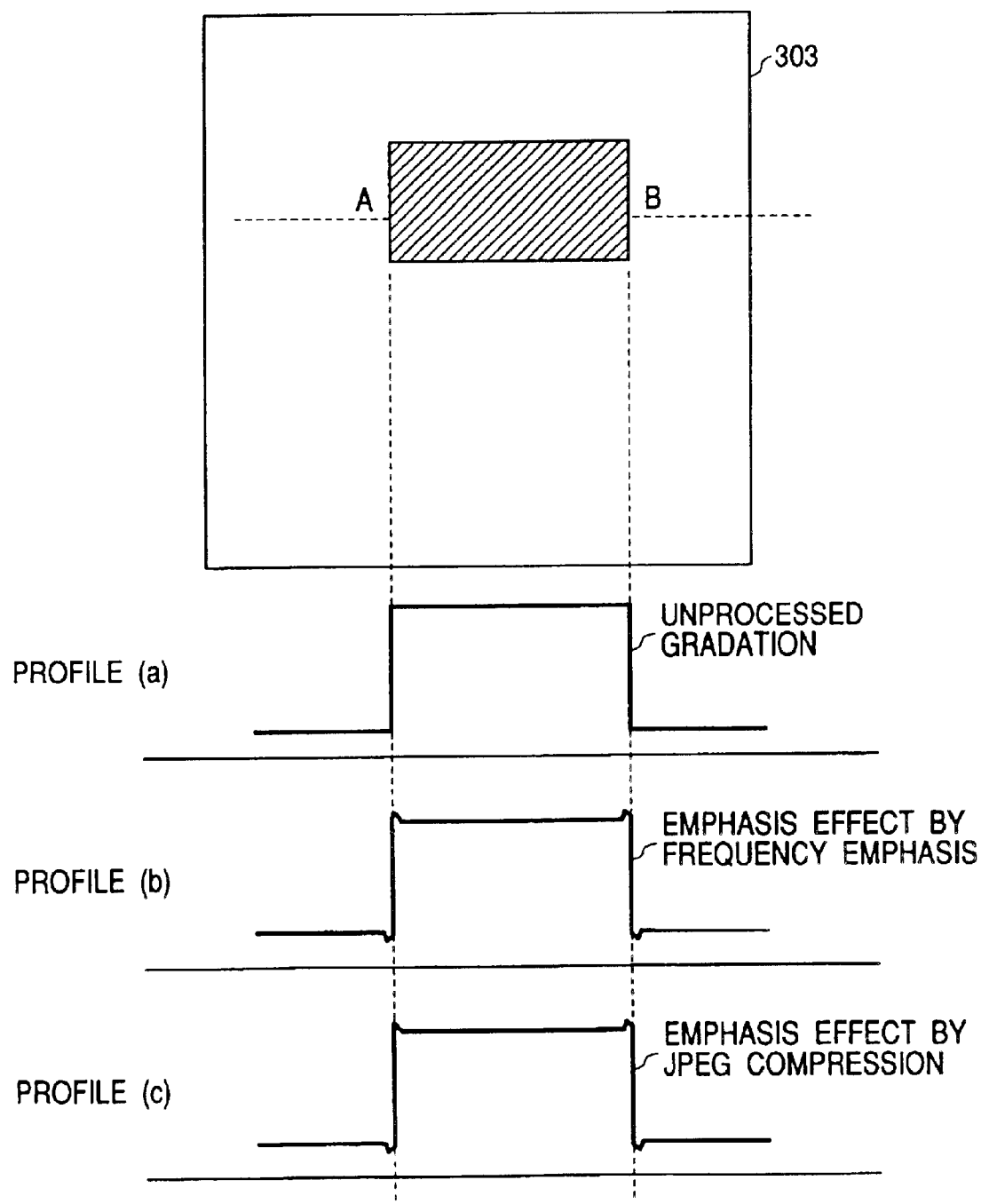
FIG. 8 is a diagram descriptive of an emphasis effect by a frequency emphasis processing and a compression processing of an X-ray photographing image.

FIG. 8 shows an emphasis effect for a trimmed image 303 by the frequency emphasis processing and the non-reversible image compression processing as a profile (a) of an image before the processings, a profile (b) of an image after the frequency emphasis processing and a profile (c) of an image developed after the non-reversible image compression processing.

In FIG. 8, the trimmed image 303 to be processed is traced as an image having rising edges, an ordinate represents densities and an abscissa designates length between A and B of the trimmed image 303.

Emphasis effects are seen at edge portions of both the profiles (b) of the image after the frequency emphasis processing and the profile (c) of the image developed after the non-reversible image compression processing.

When the trimmed image 303 is transferred after the frequency emphasis processing and the non-reversible image compression processing, the emphasis effects by both the processings are multiplied by each other, thereby making it impossible to obtain an expected frequency emphasis effect.

In order to prevent the multiplication of both the processings, an emphasis parameter for the frequency emphasis processing is given for the frequency emphasis processing dependently on a predetermined quality value to be given for the predetermined non-reversible image compression processing.

FIG. 9 is a table which is to be referred to at a photographing time to set the emphasis parameter for the frequency emphasis processing dependently on the quality value to be given for the non-reversible image compression processing and stored in the image processing system as a rule.

As shown in FIG. 9, emphasis parameters values from "0" to "10" are set at five steps for a case where the non-reversible image compression is not to be performed (a "None" line in FIG. 9).

Specifically, the emphasis parameters to be used for the frequency emphasis processing are set as five values of "0", "3", "5", "8" and "10" within a range from "0" to "10".

Here, "0" indicates that the frequency emphasis processing is not to be performed at all and "10" indicates that the frequency emphasis processing is to be performed at an emphasis degree corresponding to a predetermined maximum value. Furthermore, intermediate values indicate that emphasis degrees of the frequency emphasis processing are higher in proportion to the above described values.

Furthermore, emphasis parameters are set at five steps for each of other quality items (quality values) of the non-reversible compression processing.

Larger quality values to be given for the non-reversible compression processing indicate images kept at higher qualities and to be compressed at lower degrees. Smaller quality values indicate images kept at degraded qualities and to be compressed at higher degrees.

In the table shown in FIG. 9, the values are set so that emphasis effects of images will be as equal as possible after performing both the frequency emphasis processing and the non-reversible compression processing.

By referring to the above described table, the image processing unit 150 perfumes the frequency emphasis processing and the non-reversible compression processing using appropriate emphasis parameters.

Step 206: Image Transfer

The image processing unit 150 recognizes the irradiation field area (step S201), trims a required area (irradiation field area) of the X-ray photographing image (step S202), performs various kinds of processings of the trimmed image (steps S203 to S205) and transfers the trimmed image after the processings to an image server, an image viewer or the like by way of the LAN/IF 113 (step S206).

Step S207: Frequency Emphasis Processing for Printing

On the other hand, the image processing unit 150 transfers the X-ray photographing image to a laser imager, a printer or the like which outputs an image to a film as the network transfer.

To transfer the X-ray photographing image to the printer, for example, the image processing unit 150 first performs the frequency emphasis processing of the trimmed image after the gradation conversion processing at the step S203. At this time, the image processing unit 150 performs the frequency emphasis processing using an emphasis parameter in the table shown in FIG. 9 which is set for the case where the non-reversible compression processing is not to be performed at all (an emphasis parameter set in the non-reversible compression processing "None" quality line). This is because the image is transferred to the printer without being compressed.

Steps S208 and S209: Image Arrangement

The image arrangement processing unit 160 arranges the trimmed image after the frequency emphasis processing at the step S207 together with trimmed images already collected after the frequency emphasis processing within an output area of a definite size (step S208).

When a margin to arrange an image still remains in the output area, the image arrangement processing unit 160 starts collecting a next image without proceeding to a next step S210 (without transferring the trimmed images). When an image can not be arranged in the output area, the image arrangement processing unit 160 proceeds to the next step S210 (step S209).

The step S208 will be detailed later.

Step 210: Generation of Image to be Transferred

The image arrangement processing unit 160 generates an image to be transferred to the laser imager (image for transfer) from plural images arranged in the output area, except for the image arranged last at step S208.

Step S211: Image Transfer

The image arrangement processing unit 160 transfers the image generated at step S210 to the laser imager by way of the LAN/IF 113.

[Image Arrangement Processing]

The image arrangement processing unit 160 which performs the image arrangement processing at the above described step S208 (see FIG. 3) is characterized most by carrying out processings as described below using a configuration shown in FIG. 2 in the present embodiment.

Figure 10:
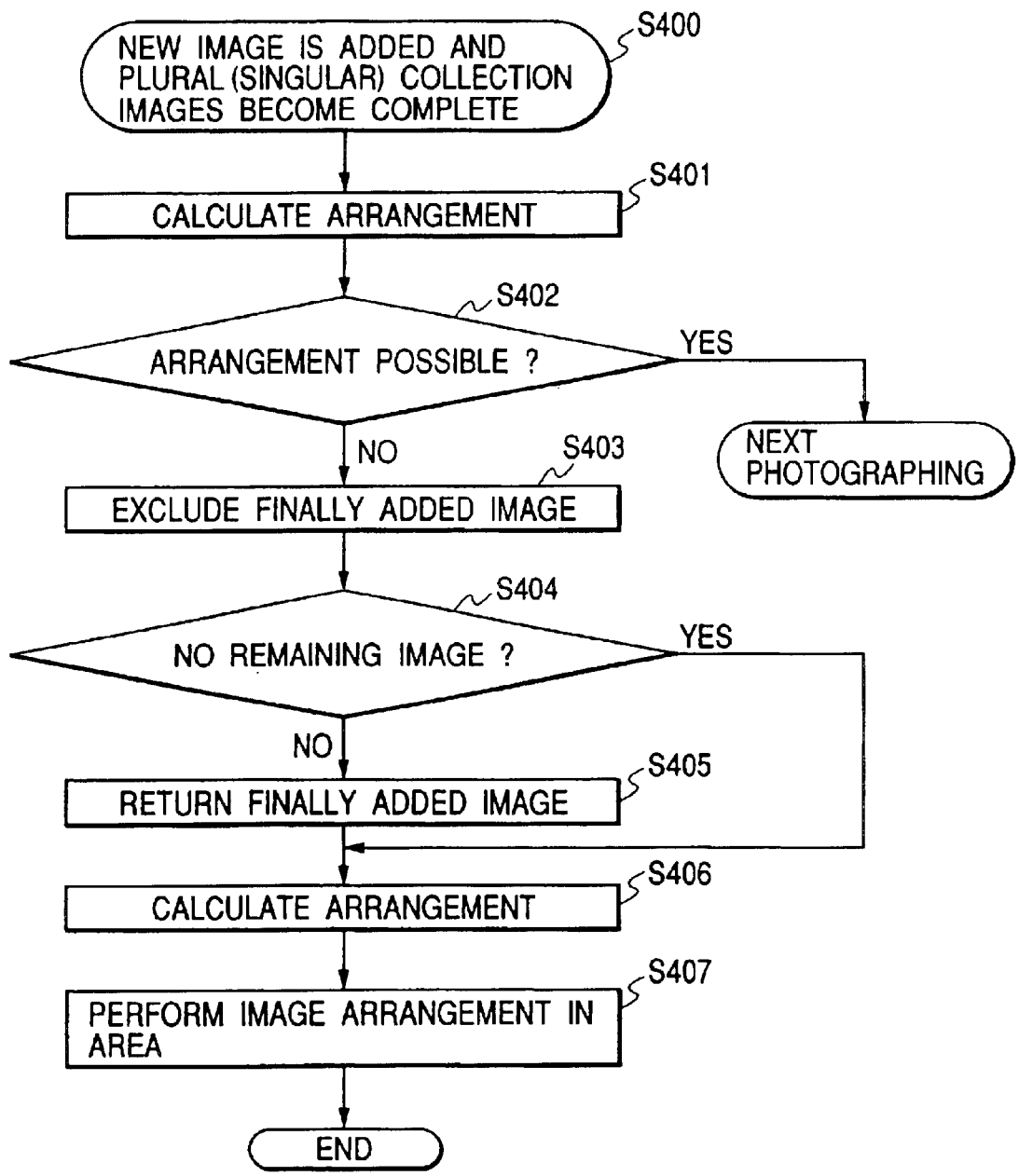
FIG. 10 is a flow chart descriptive of processings for arranging plural X-ray photographing images in a definite output area.
Figure 11:
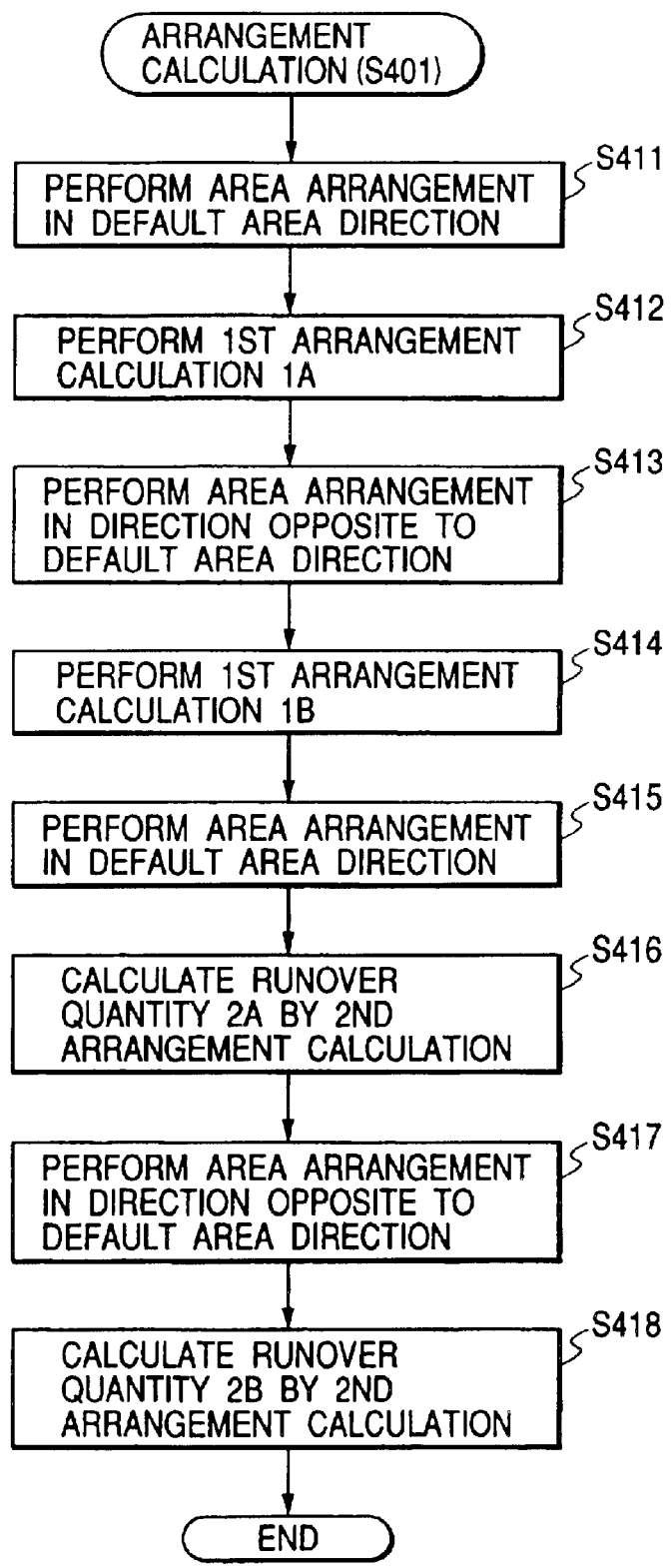
FIG. 11 is a flow chart descriptive of an image arrangement calculation processing.
Figure 12:
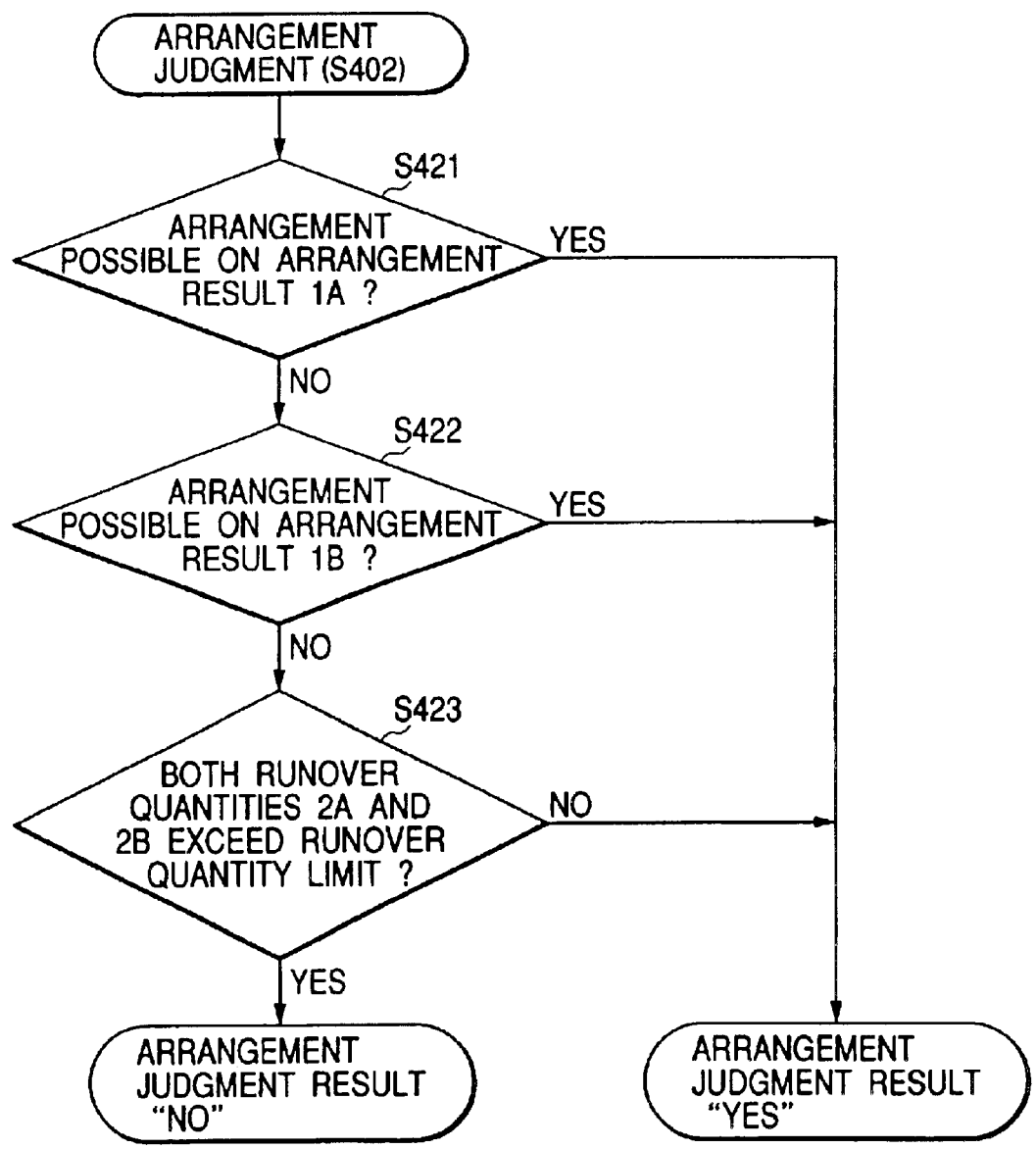
FIG. 12 is a flow chart descriptive of an image arrangement judgment processing.
Figure 13:
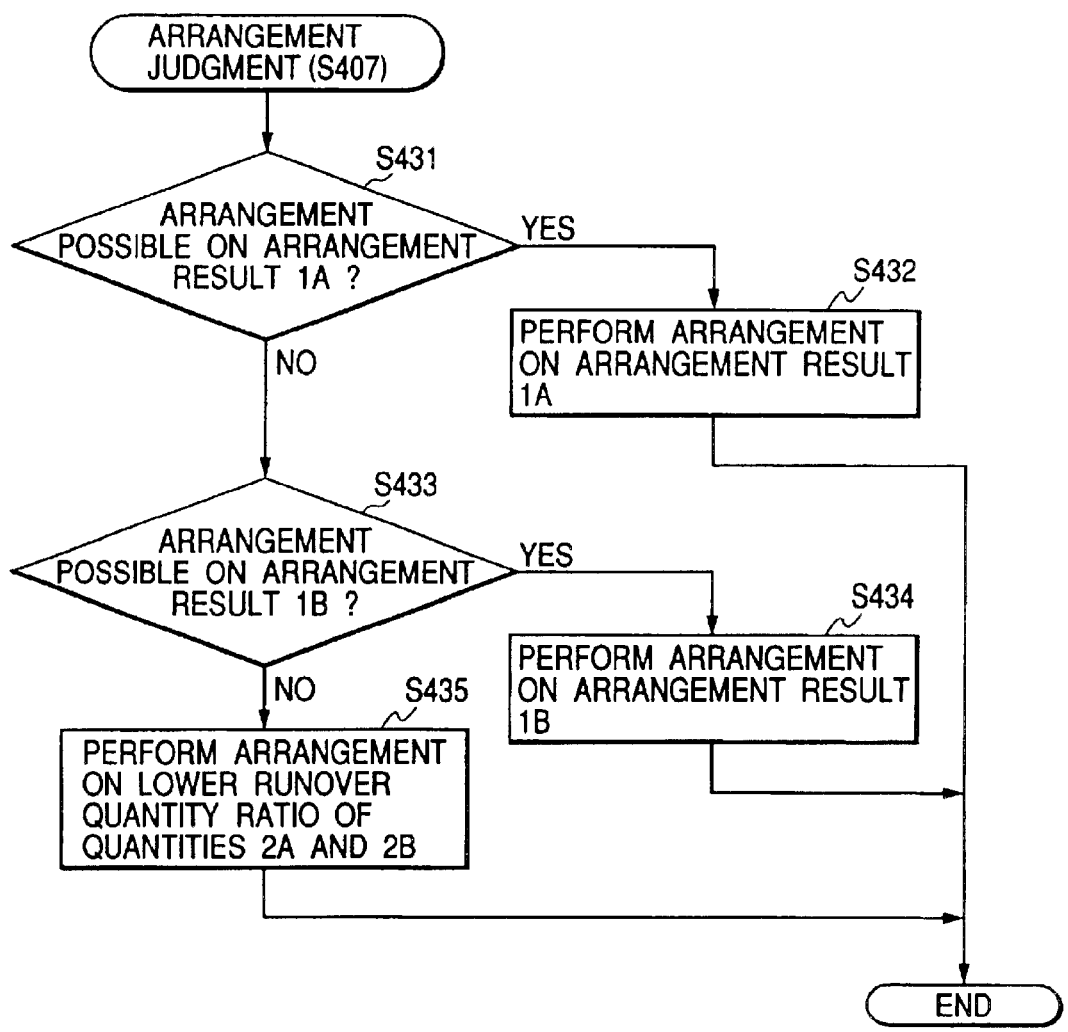
FIG. 13 is a flow chart descriptive of an image arrangement processing.

FIG. 10 shows details of processings by the image arrangement processing unit 160, image calculate arrangement at the step S208 shown in FIG. 3 in particular, and FIGS. 11 to 13 show details of a calculate arrangement processing, an arrangement judgement processing and an image arrangement processing in FIG. 10.

Step S400:

First, the image collection unit 161 adds an image obtained by processing of this time to the images so far collected (the images after the frequency emphasis processing by the image processing unit 150). Accordingly, plural images are collected completely. At this time, the image collection unit 161 settles images belonging to a same group. Subsequent processings are performed to the plural images belong to the same group. Herein, "The same group" means a group of X-ray photographing images which are obtained from a same object and is generally referred to as "study" or "inspection".

Step S401:

Then, the image collection unit 161 performs following steps S411 to S418 (see FIG. 11) for the plural images belonging to the same group.

Step S411:

The CPU 118 preliminarily specifies a film disposition, for example, a vertical disposition or a horizontal disposition to be utilized at a time of image output. This specification information is supplied by the area direction instruction unit 162 to the first arrangement calculation unit 163.

Figure 14:
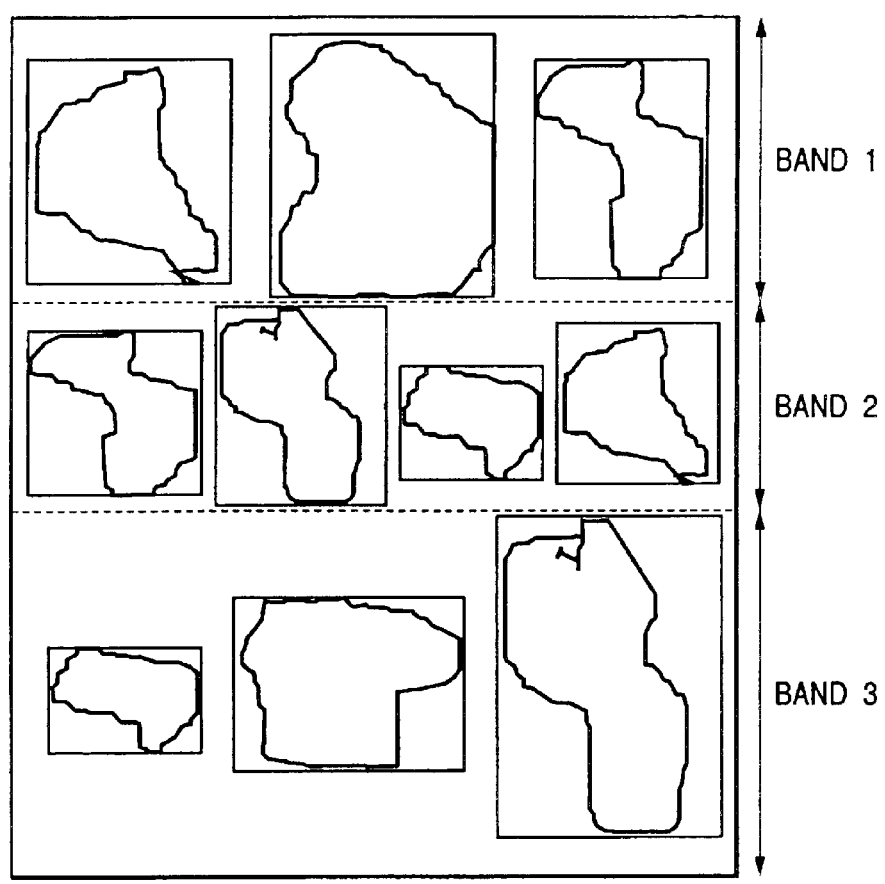
FIG. 14 is a diagram descriptive of an image arrangement in line bands.
Figure 15:
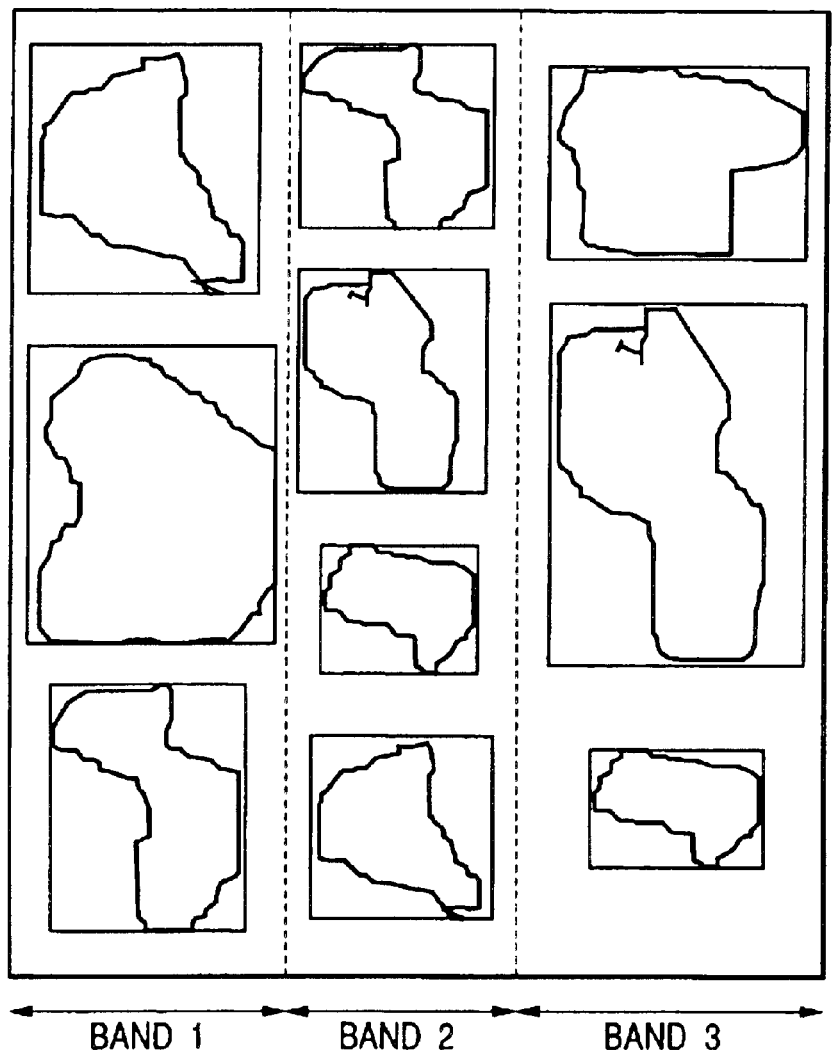
FIG. 15 is a diagram descriptive of an image arrangement in row bands.

According to the film disposition (default direction A) instructed from the area direction instruction unit 162, the first arrangement calculation unit 163 prepares an output area shown in FIG. 14 or FIG. 15.

The vertical disposition is instructed herein and the plural images are arranged in line bands shown in FIG. 14. A printer at a image transfer destination is a printer having an output function of a depth of 12 bits and an output area in the default direction A has resolution of 2048 pixels in the horizontal direction and 2560 pixels in the vertical direction.

Step S412:

The first arrangement calculation unit 163 performs an arrangement calculation to arrange the plural collected images in the output area in the default direction (vertical disposition) prepared at the step S411.

Figure 16:
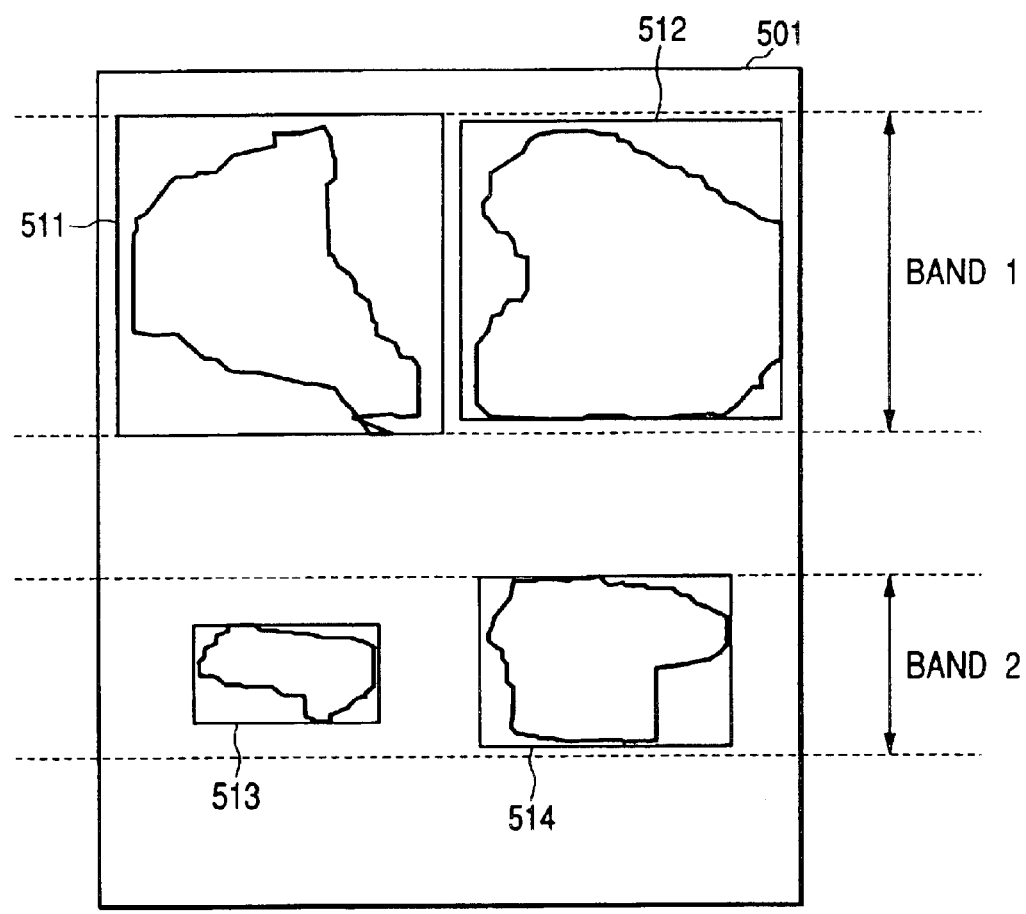
FIG. 16 is a diagram descriptive of an image arrangement in an output area in a default direction.

Specifically, FIG. 16 shows, as an example, a case where four images 511 to 514 in an output area 501 having the vertical disposition.

In this output area original images are arranged in original sizes without being enlarged or contracted. The images 511 to 514 are arranged first in an area of a band 1 of the output area 501 in an order of collection by the image collection unit 161 (order of images 511, 512, 513 and 514) and images which can not be arranged in the band 1 are arranged in an area of a band 2. Bands are filled from upside to downside in the output area 501.

In FIG. 16, the first image 511 and the second image 512 are arranged in the band 1. The third image 513 can not be arranged in the band 1 and is arranged in the next band 2.

Accordingly, the first image 511 and the second image 512 are arranged in the band 1, and the two rest images 513 and 514 are arranged in the band 2.

Figure 17:
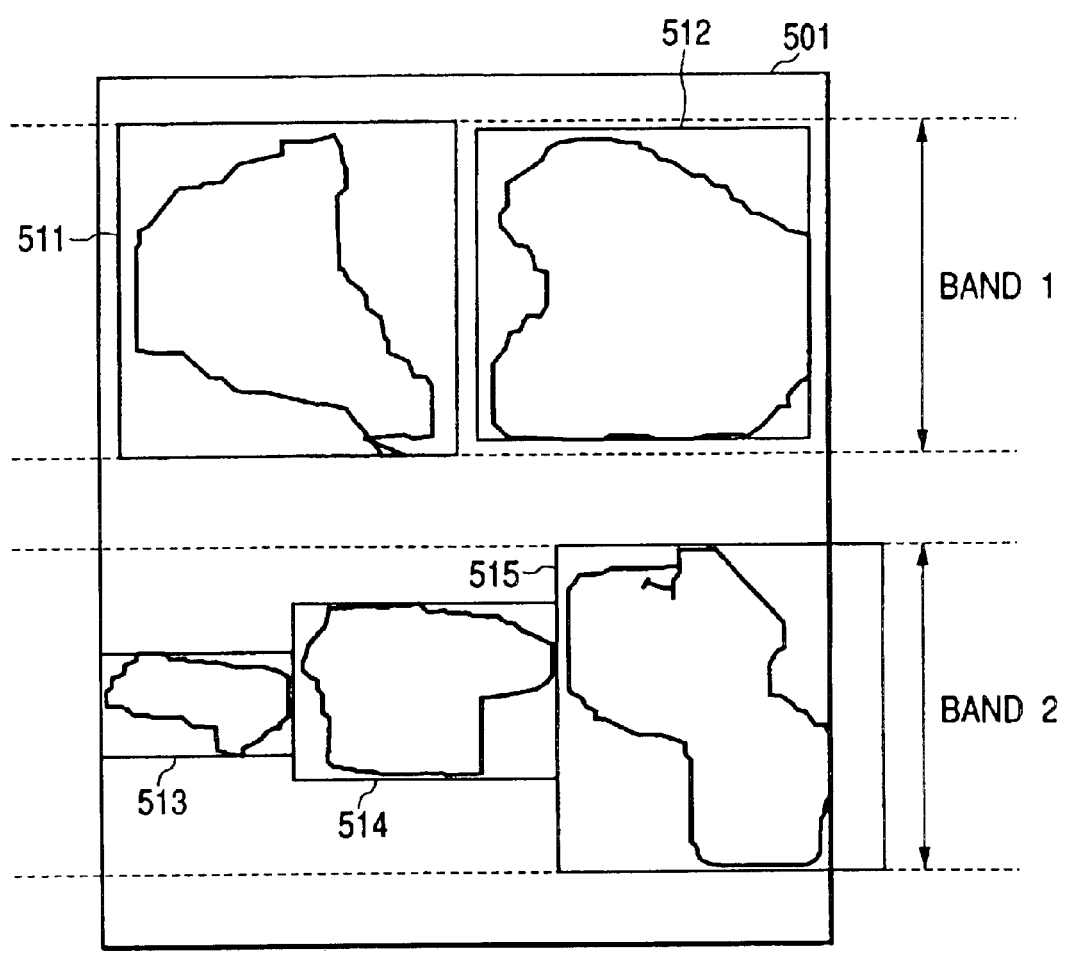
FIG. 17 is a diagram descriptive of a condition where a turnover quantity is produced in a horizontal direction in the image arrangement in the output area in the default direction.

FIG. 17 shows an arrangement manner of five images 511 to 515 in the output area 501 in a case where a new image 515 is added to the four images 511 to 514 shown in FIG. 16.

In this case, the first image 511 and the second image 512 can be arranged in the band 1 but the third to fifth images 513 to 515 can not be arranged in the band 2. In a case where the output area 501 has a margin in the vertical direction but no margin in the horizontal direction as described above, the last image 515 is arranged so as to run over in the horizontal direction.

Step S413:

The first arrangement calculation unit 163 prepares an output area in a direction B (horizontal disposition) reverse to the default direction A (vertical disposition) at the above described step S411.

Step S414:

The first arrangement calculation unit 163 performs an arrangement calculation for arranging the plural collected images in the output area in the direction B (horizontal disposition) prepared at Step S413.

Figure 18:
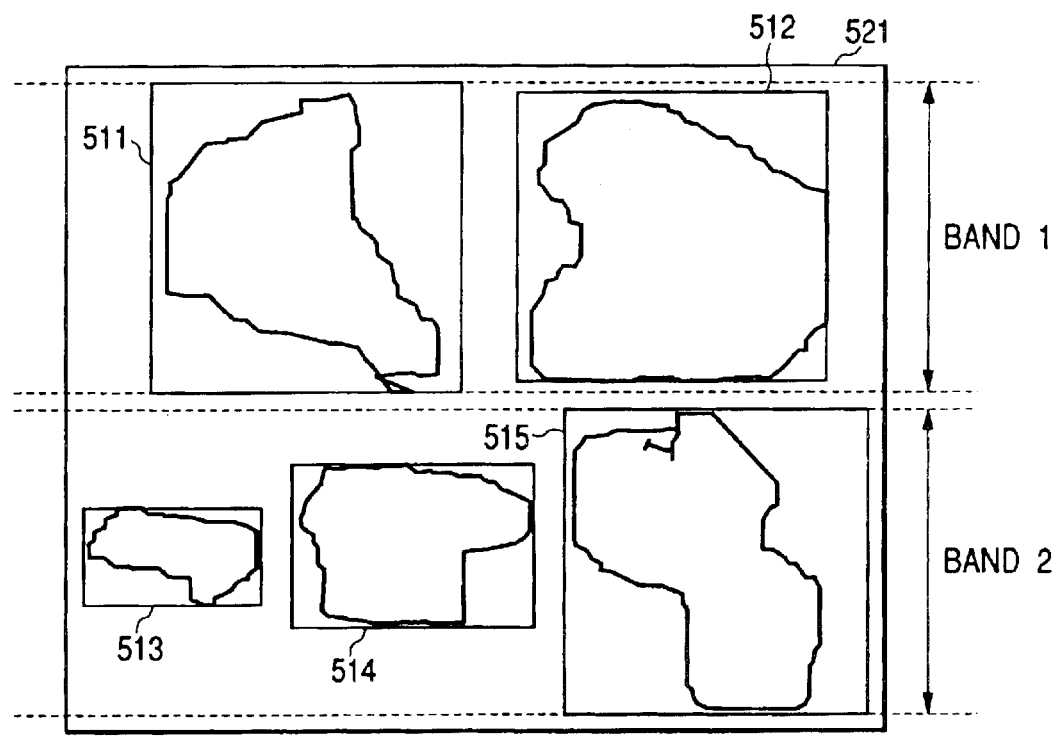
FIG. 18 is a diagram descriptive of an image arrangement in the output area in a direction reverse to the default direction.

In this case, all the five images 511 to 515 are arranged in the band 1 and the band 2 with no runover as shown in FIG. 18 in contrast to an image arrangement shown in FIG. 17. That is, the direction B (horizontal disposition) makes it possible to arrange the five images 51 to 515 in an output area 521.

Figure 19:
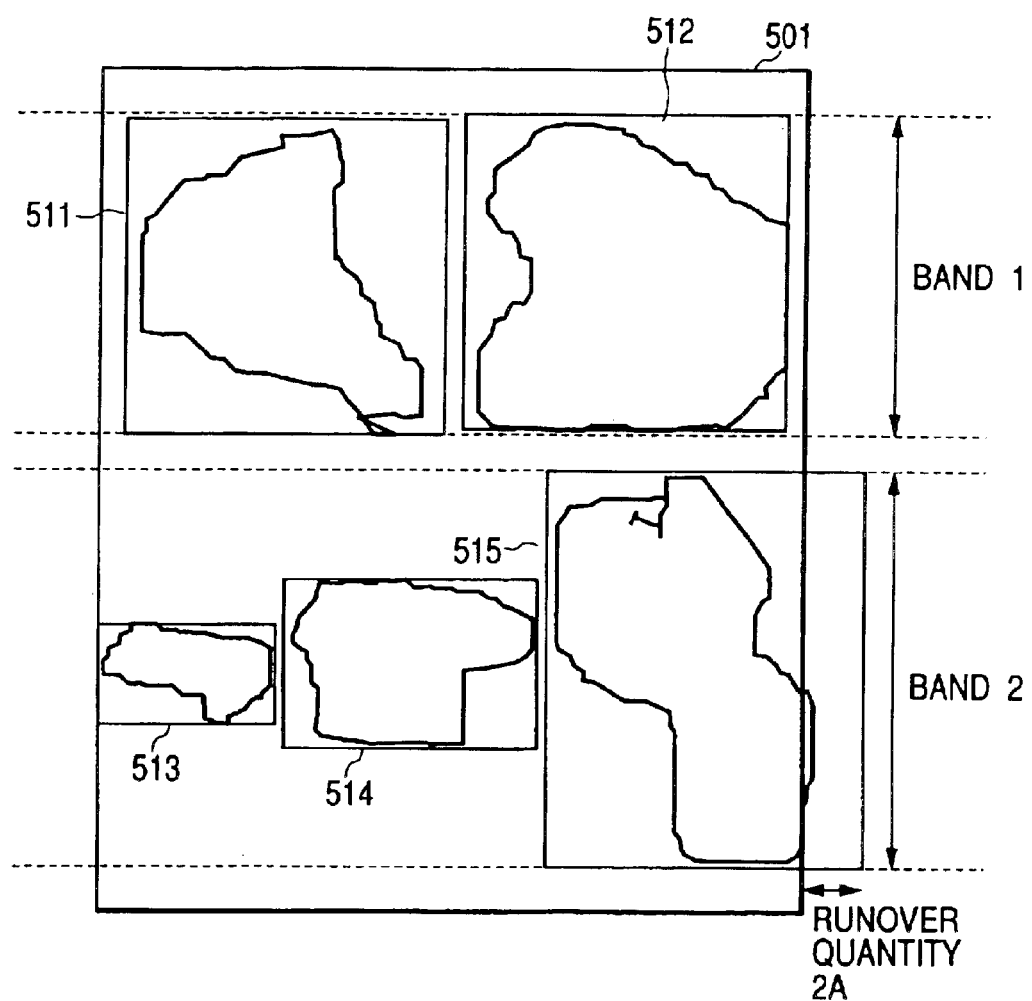
FIG. 19 is a diagram descriptive of a processing for deleting an image margin when the turnover quantity is produced.

Step S415:

The second arrangement calculation unit 164 prepares an output area 501 in the default direction A (vertical disposition) as shown in FIG. 19 as the first arrangement calculation unit 163 prepares the output area 521 at step S411.

In this case, the final image 515 is arranged in a condition where the image runs over in the horizontal direction as described above.

Step S416:

The second arrangement calculation unit 164 calculates a runover quantity 2A of the image from the output area 501 in the default direction A (vertical disposition).

The calculation at this step provides a significant result only when an image runs over an output area. When an image does not run over, a runover quantity is "0" (2A=0) and an arrangement result is the same as that at step S412.

Since the output area 501 in the default direction A (vertical disposition) has a margin in the vertical direction but no margin in the horizontal direction as shown in FIG. 19, the final image 515 is in a runover condition and the second arrangement calculation unit 164 calculates the runover quantity 2A of the image 515 in the horizontal direction.

Using the deletion unit 165, the second arrangement calculation unit 164 horizontally deletes all images 513 to 515 existing in the band 2 in which the image 515 producing the runover exists by quantities proportional to horizontal widths of the images out of the runover quantity 2A.

Figure 20:
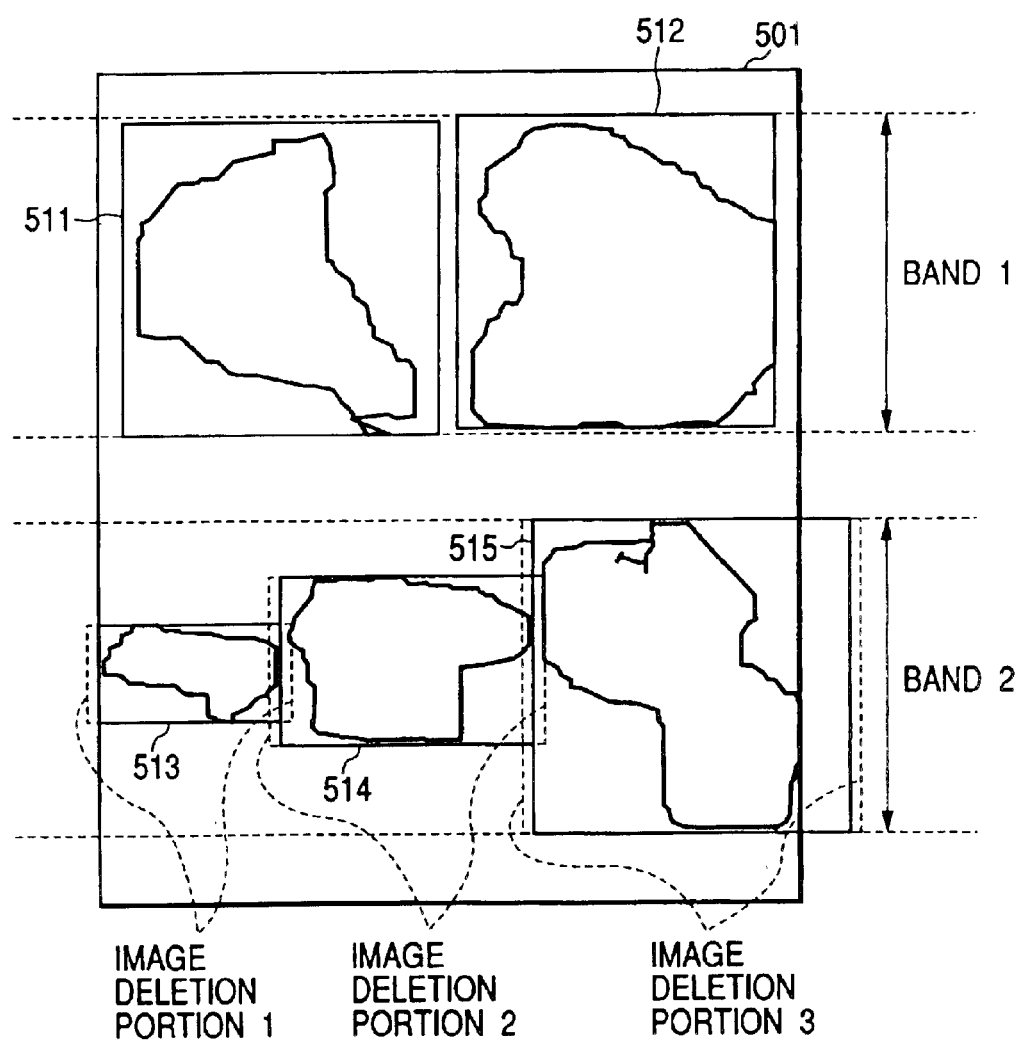
FIG. 20 is a diagram descriptive of a result obtained by deleting the image margin.

In FIG. 20, left and right sides of the image 513 are deleted by a quantity 1 proportional to a horizontal width of the image 513, left and right sides of the image 514 are deleted by a quantity 2 proportional to a horizontal width of the image 514, and left and right sides of the image 515 are deleted by a quantity 3 proportional to a horizontal width of the image 515.

Accordingly, the runover quantity 2A produced by the image 515 (see the above described FIG. 19) can be canceled.

Step S417:

The second arrangement calculation unit 164 prepares an output area in the direction B (horizontal disposition) reverse to the default direction A as the first arrangement calculation unit 163 prepares the output area at step S413.

Step S418:

The second arrangement calculation unit 164 calculates an image runover quantity 2B in the output area in the direction B (horizontal disposition).

The calculation at this step produces a significant result only when an image runs over the output area. That is, a runover quantity is "0" (2B=0) and an image arrangement result is the same as that at step 414 when an image does not run over the output area.

At step S401 which includes steps S411 to S418, an arrangement result 1A in the output area in the default direction A (vertical direction), an arrangement result 1B in the output area in the direction B (horizontal disposition) opposite to the default direction A, a runover quantity 2A on the arrangement result 1A and a runover quantity 2B on the arrangement result 1B are obtained as described above.

It is assumed that an image arrangement shown in FIG. 17 (an image runs over) is obtained as the arrangement result 1A and an image arrangement shown in FIG. 18 (an image does not run over) is obtained as the arrangement result 1B.

Step S402:

Then, the image arrangement unit 166 judges what image arrangement is most effective from the arrangement results 1A and 1B obtained with the first arrangement calculation unit 163. This judgement performed at subsequent steps S421 to S423 (see FIG. 12).

Step S421:

First, the image arrangement unit 166 judges whether or not image arrangement is possible on the arrangement result 1A for the output area in the default direction A (vertical disposition) obtained with the first arrangement calculation unit 163 (see step S412).

When image arrangement is possible as a result of this judgement, the image arrangement unit 166 provides an arrangement judgement result "Yes".

Step S422:

When the arrangement is impossible on the arrangement result 1A as a result of the judgement at step S421, the image arrangement unit 166 judges whether or not image arrangement is possible on the arrangement result 1B for the output area in the direction B (horizontal disposition) opposite to the default direction A obtained with the first arrangement calculation unit 163 (see step S414).

When image arrangement is possible a result of this judgement, the image arrangement unit 166 provides an arrangement judgement result "Yes".

Step S423:

When the image arrangement is impossible on the arrangement result 1B as a result of the judgement at step S422, that is, when image arrangement is not possible in either the vertical disposition or the horizontal direction, a runover quantity is produced and the image arrangement unit 166 judges whether or not the runover quantities 2A and 2B obtained by the second image arrangement calculation unit 164 (see the steps S416 and S418) exceed predetermined limits.

Though definite numbers of pixels (for example, 100 pixels), for example, may be used as the above described limits of runover quantities, lengths calculated at a definite ratio from the horizontal direction and the vertical direction of the image output area are used as the limits. Specifically, the ratio is 10%, a limit of the runover quantity 2A in the vertical disposition is 10% of 2560 pixels, or 256 pixels, and a limit of the runover quantity 2B in the horizontal direction is 10% of 2048 pixels, or 204 pixels.

These limits are adopted to prevent too many images from being deleted, thereby losing information important for image diagnoses in a medical field.

The image arrangement unit 166 therefore provides an arrangement judgment result "No" when both the runover quantity 2A in the vertical disposition and the runover quantity 2B in the horizontal disposition exceed the predetermined limits. Otherwise, the image arrangement unit 166 provides the arrangement judgment result "Yes".

By executing step S402 including steps S421 to S423 as described above, the image arrangement processing unit 160 judges validities of the arrangement result 1A in the vertical disposition and the arrangement result 1B in the horizontal disposition.

When a result of this judgment is "Yes", that is, when a next collection of images can possibly be arranged in the same output area, the image arrangement processing unit 160 starts collecting next images.

When a result of the judgment is "No", that is, when the next collection of images can not be arranged in the same output area, on the other hand, the image arrangement processing unit 160 proceeds to processings at next steps S403 and later.

Step S403:

When the result of the judgment at step S403 indicates a condition where the next collection of images can not be arranged in the same output area, the image arrangement processing unit 160 judges that a cause for the condition is the addition of the final image and arranges rest images excluding the final image in the output area.

Steps S404 and S405:

At this time, no image may remain after excluding the final image. That is, there may be a case where only one image is to be arranged in the output area. The image arrangement processing unit 160 therefore judges whether or not no image is to be processed after excluding the final image (step S404).

Only when no image is to be processed as a result of the judgment, the image arrangement processing unit 160 returns the final image to be deleted as an image to be processed (step S405).

Step S406:

Accordingly, the image arrangement processing unit 160 performs image arrangement of the rest images excluding the final image or one image in the output area once again (the image arrangement at step S401).

Step S407:

On the basis of an image arrangement result at step S406, the image arrangement processing unit 160 actually arranges the images in the output area. This image arrangement is carried out at next steps S431 to S435 (see FIG. 13).

Steps S431 and S432:

Dependently on an image arrangement result of the first arrangement calculation unit 163 (see step S406), the image arrangement unit 166 first judges whether or not image arrangement is possible on the arrangement result 1A for the output area in the default direction A (vertical disposition) (step S431).

When the image arrangement is possible as a result of this judgment, the image arrangement unit 166 arranges the images in the output area on the basis of the arrangement result 1A for the vertical disposition.

Steps S433 and S434:

When a judgment result at step S431 indicates that the image arrangement is not possible on the arrangement result 1A the image arrangement unit 166 judges whether or not the image arrangement is possible on the arrangement result 1B for the output area in the direction B opposite to the default direction A dependently on the image arrangement result obtained with the first arrangement calculation unit 163 (see step S406) (step S433).

When the image arrangement is possible as a result of this judgment, the image arrangement unit 166 arranges the images in the output area on the basis of the arrangement result 1B for the horizontal disposition.

Step S435:

When a judgement result at step S433 indicates that the image arrangement is not possible on the arrangement result 1B, that is, when the image arrangement is impossible in both the vertical disposition and the horizontal disposition, the images run over and the image arrangement unit 166 calculates ratios of the runover quantities 2A and 2B obtained by the second arrangement calculation unit 164 relative to the limits of runover quantities at the above described step S423. On the basis of an arrangement result whichever has lower ratio, the image arrangement unit 177 arranges the images in the output area.

When no margin remains in the horizontal direction and a certain image runs over in arranging plural images consecutively in the bands of the output area, the embodiment calculates deletion widths of images which exist in a band including the runover image at ratios proportional to widths of the images and deletes the deletion widths of the images, thereby being capable of arranging the images with a high efficiency.

Furthermore, the embodiment is capable of effective arranging images of original image sizes (life sizes) without enlarging or contracting, thereby permitting observation of the images of the life sizes when an area (output area) in which the images have been arranged is output to a display or a film for observation. This is effective for image diagnoses in the medial field or the like.

When it is judged that deletion of image portions is permissible at a certain degree and the deletion is effective for arrangement, the embodiment deletes the above described image portions and then arranges images, thereby making it possible to use an output area effectively.

The embodiment may be configured so that the bands of the output area in which images are to be arranged are equal to one another in the output area. Furthermore, the embodiment may be configured so that images are arranged more equally in the bands.

Since the embodiment is configured so that images are photographed in sizes which can always be arranged within the output area, the embodiment is capable of arranging an image in the output area even when only one image is to be arranged in the output area and effective even in a case, for example, where an image is too large for arrangement in the output area since the embodiment deletes only marginal portions of the image.

Though the embodiment is configured to arrange images in the line bands shown in FIG. 14, the present invention is not limited by the embodiment and the image processing system functions effectively even when images are arranged in the row bands shown in FIG. 15, for example, which replaces vertical and horizontal concepts with each other.

Though a runover quantity is produced in the horizontal direction in the embodiment, deletion quantities are calculated in proportion to widths of all bands 1 and 2 existing in the output area 501 so as to just zero runover quantities when a margin remains in the horizontal direction but no margin remains in the vertical direction and a final image 515 runs over in the vertical direction.

Accordingly, marginal portions of images which have portions exceeding the deletion quantities are deleted in quantities corresponding to the deletion quantities.

Figure 21:
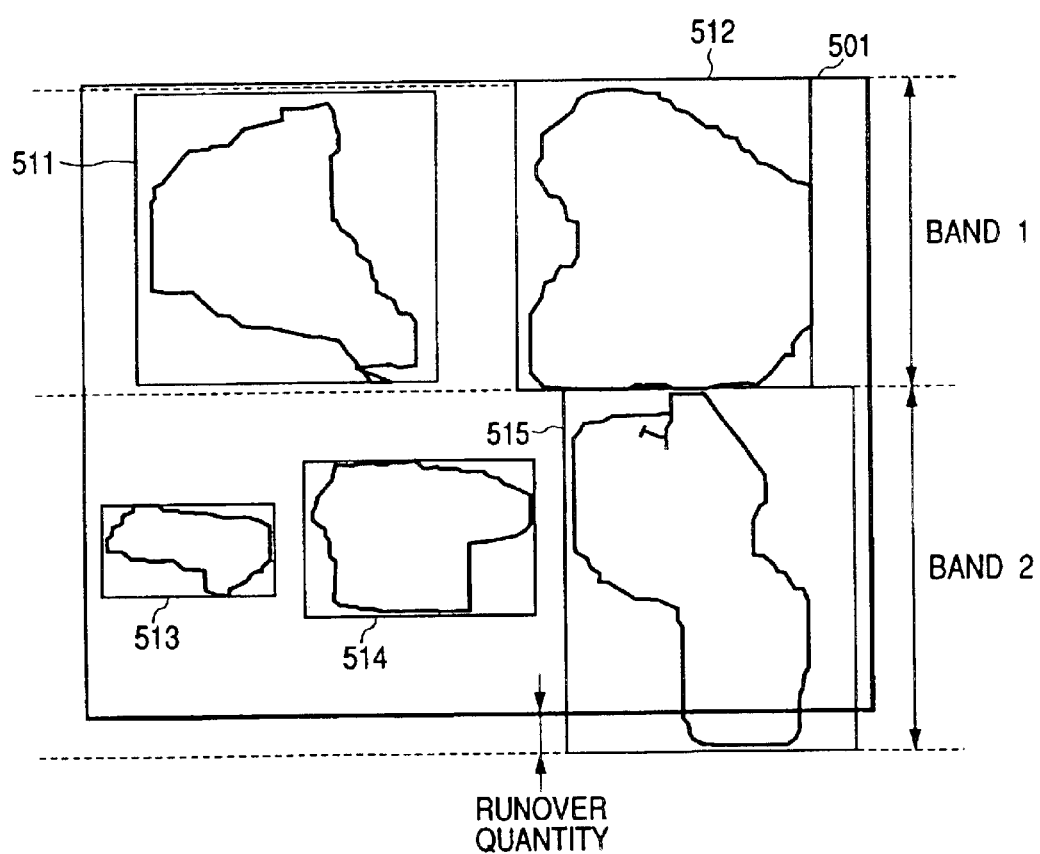
FIG. 21 is a diagram descriptive of a condition where a turnover quantity is produced in a vertical direction in the image arrangement in the output area in the default direction.
Figure 22:
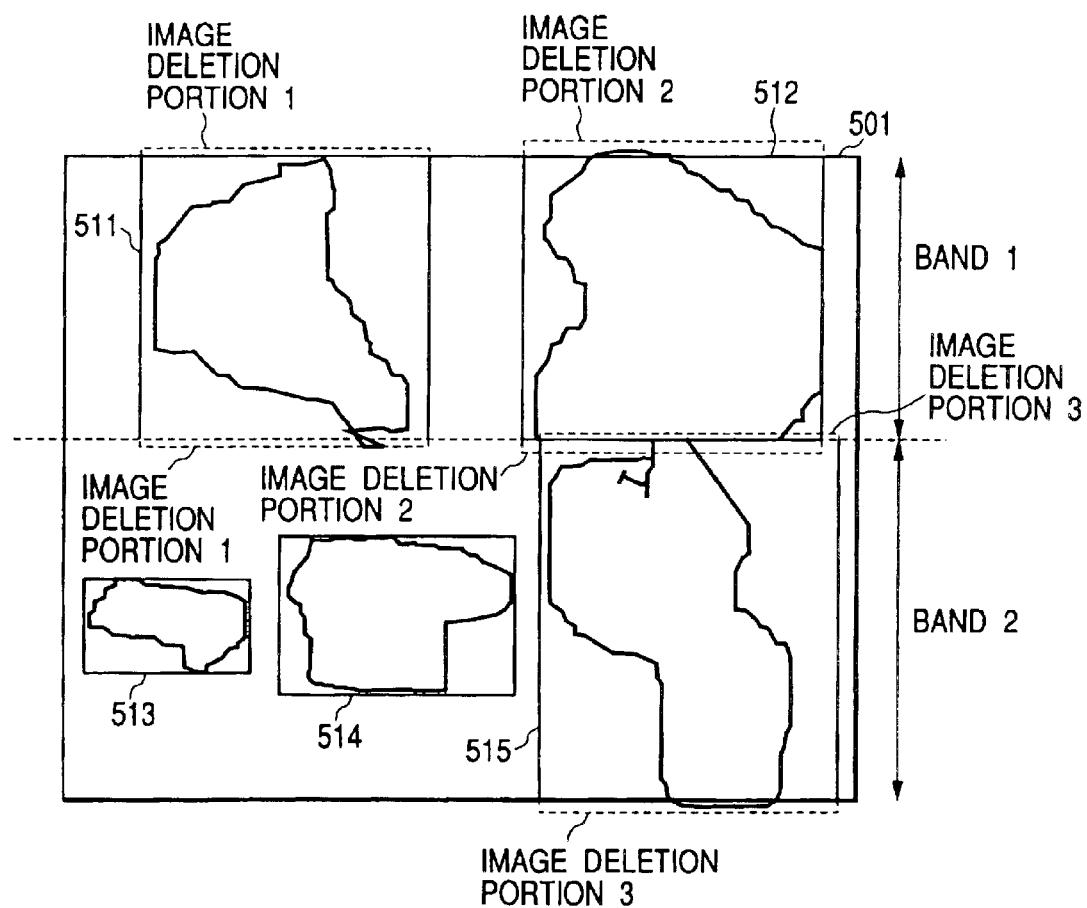
FIG. 22 is a diagram descriptive of a result obtained by deleting an image margin when the turnover quantity is produced.

FIG. 22 shows a result obtained by deleting images in an arrangement condition shown in FIG. 21.

The deletion quantities are calculated for the bands 1 and 2 existing in the output area 501, and deleted from images 511, 512 and 515 having portions exceeding the deletion quantities are deletion portions 1, 2 and 3, which are a lower portion of the image 511, an upper portion of the image 512 and upper and lower portions of the image 515. In other words, widths of the bands 1 and 2 are narrowed in proportion to the band widths, and upper and lower portions of images to be arranged in these bands are deleted.

Though the embodiment is configured to arrange images of the same group in the output area by consecutively adding images obtained by photographing an object, the present invention is not limited by the embodiment and the image processing system functions effectively for an apparatus or a system (laser imager or printer) which arranges images of the same group in an output area by consecutively adding images transferred from outside, for example, by way of a network. In such a case, however, "next photographing" in FIGS. 3 and 10 is replaced with "wait for next image".

Though the invention achieved by the inventor is described specifically on the basis of a preferable embodiment, the present invention is not limited by the embodiment and is modifiable needless to say within a scope of the present invention.

Though the embodiment is configured by software for easy practice as well as for simplicity and convenience of description, the present invention is not limited by the embodiment and the image processing system can be configured by hardware. In this case, processings can be executed more speedily.

Though the present invention is applied to X-rays in the embodiment, the present invention is not limited by the embodiment and the present invention is applicable to another photography, for example photography using visible rays.

Furthermore, it is needless to say that the objects of the present invention can be attained by supplying a system or an apparatus with a memory medium storing program codes of software which realizes functions of the host and terminal functions in the embodiment, and reading and executing the program codes stored in the memory medium with a computer (or a CPU or an MPU) of the system or the apparatus.

In this case, the program codes proper which are read out of the memory medium realize the functions of the embodiment and the memory medium configures the present invention.

Usable as the memory medium for supplying the program codes is a ROM, a floppy disk, a hard disk, an optical disk, a magnetooptical disk, a CD-ROM, a CD-R, a magnetic tape, a non-volatile memory card or the like.

Furthermore, it is needless to say that the scope of the present invention includes not only a case where the functions of the embodiment are realized by executing program codes read out by a computer but also a case where the functions of the embodiment are realized by executing some or all of actual processings by an OS or the like operated by a computer.

Furthermore, it is needless to say that the scope of the present invention includes a case where program codes read out of a memory medium are written into a memory disposed in a function extension unit connected to an function extension board inserted in a computer or a function extension unit connected to a computer, some or all of actual processings are performed by a CPU or the like disposed in the function extension board or the function extension unit and the functions of the embodiment are realized by the processings.

What is claimed is:

1. An image processing system, comprising:
   image input means for inputting photographing images;
   first arrangement means for arranging plural images of optional sizes input by said image input means within an output area of a definite size;
   second arrangement means for deleting predetermined areas of the images to be arranged on the basis of an arrangement result obtained by said first arrangement means and arranges the images again within said output area; and
   image arrangement means for determining an arrangement of said images within said output area and executing said arrangement on the basis of an arrangement result obtained by said first arrangement means and an arrangement result obtained by said second arrangement means.

2. A system according to claim 1, wherein said second arrangement means deletes a predetermined area of a runover image by a quantity determined on the basis of a width of the runover image when an image runs over said output area as a result of an image arrangement by said first arrangement means.

3. A system according to claim 1, wherein said second arrangement means deletes a predetermined area of a runover image by a quantity determined on the basis of a width of an arrangement area for the runover image when an image runs over said output area as a result of an arrangement by said first arrangement means.

4. A system according to claim 1, further comprising area direction setting means for setting a direction of said output area,
   wherein said first arrangement means comprises:
   means for arranging said images in said output area in a first direction set by said area direction setting means; and
   means for arranging said images in said output area in a second direction different from said first direction.

5. A system according to claim 4, wherein said first arrangement means arranges a runover image in said second direction when an image runs over said output area as a result of arrangement of said images in said output area in said first direction.

6. A system according to claim 1, wherein said second arrangement means acquires a runover quantity when an image runs over said output area as a result of the arrangement by said first arrangement means, and
   said image arrangement means determines an arrangement of said runover image in said output area on the basis of said runover quantity.

7. A system according to claim 1, further comprising area direction setting means for setting a direction of said output area,
   wherein said first arrangement means comprises:
   means for arranging said images within said output area in a first direction set by said area direction setting means; and
   means for arranging said images within said output area in a second direction different from said first direction,
   wherein said second arrangement means comprises:
   means for acquiring a first runover quantity in an arrangement in said first direction when an image runs over said output area as a result of an arrangement by said first arrangement means; and
   means for acquiring a second runover quantity in an arrangement in said second direction, and said image arrangement means determines an arrangement of said runover image in said output area on the basis of said first runover quantity and said second runover quantity.

8. A system according to claim 7, further comprising image adding means for consecutively adding images to be arranged,
   wherein said first arrangement means arranges said images once again excluding a finally added image when said first runover quantity or said second runover quantity exceeds a predetermined quantity.

9. A system according to claim 1, wherein said image input means inputs photographed radiation images.

10. A control method of an image processing system for processing photographing images comprising:
    an image input step for inputting photographing images;
    a first arranging step for arranging plural input images of optional sizes in an output area of a definite size;
    a second arranging step for deleting predetermined areas of images to be arranged on the basis of an arrangement result at said first arranging step and arranging the images within said output area once again; and
    an image arrangement step for determining an arrangement of the images in said output area on the basis of an arrangement result at said first arranging step and an arrangement result at said second arranging step.

11. A control method according to claim 10, wherein a predetermined area of a runover image is deleted by a quantity determined at said second arranging step on the basis of a width of the runover image when an image runs over said output area as a result of an arrangement at said first arranging step.

12. A control method according to claim 10, wherein a predetermined area of a runover image is deleted by a quantity determined at said second arranging step on the basis of a width of an arrangement area when an image runs over said output area as a result of an arrangement at said first arranging step.

13. A control method according to claim 10, further comprising an area direction setting step of setting a direction of said output area,
wherein said images are arranged in said output area in a first direction set at said area direction setting step and in a second direction different from said first direction.

14. A control method according to claim 13, wherein a runover image is arranged in said output area in said second direction at said first arranging step when an image runs over said output area as a result of arranging said images in said output area in said first direction.

15. A control method according to claim 10, wherein a runover quantity is acquired at said second arranging step when an image runs over said output area as a result of an arrangement at said first arranging step, and
an arrangement of said runover image in said output area is determined at said executing step on the basis of said runover quantity.

16. A control method according to claim 10, further comprising an area direction setting step of setting a direction of said output area,
wherein said images are arranged in said output area at said first arranging step in a first direction set at said area direction setting step and said images are further arranged in said output area in a second direction different from said first direction,
a first runover quantity in a disposition in said first direction and a second runover quantity in said second direction are acquired at said second arranging step when an image runs over said output area as a result of an arrangement at said first arranging step, and
an arrangement of said runover image in said output area is determined at said executing step on the basis of said first runover quantity and said second runover quantity.

17. A control method according to claim 16, further comprising an image addition step of consecutively adding images to be processed,
wherein said images are arranged once again with a finally added image excluded at said first arranging step when either of said first runover quantity or said second runover quantity exceeds a predetermined quantity.

18. A control method according to claim 10, wherein photographed radiation images are input at said image input step.

19. A memory medium storing a program readable by a computer for allowing an image processing system for processing photographing images to execute the following steps,
wherein said program comprises:
an image input step for inputting photographing images;
a first arranging step for arranging plural input images of optional sizes in an output area of a definite size;
a second arranging step for deleting predetermined areas of the images to be arranged on the basis of an arrangement result at said first arranging step and arranging the images within said output area once again; and
an image arrangement step for determining an arrangement of the images in said output area on the basis of an arrangement result at said first arranging step and an arrangement result at said second arranging step, and executing said arrangement.

20. An image arranging method for consecutively arranging plural images of optional sizes from a left upside to a right downside in an output area of a definite size so that the images are arranged in bands in a line or row direction in said output area, comprising:
a first arranging step of arranging said plural images in said output area;
a second arranging step of arranging said plural images once again in said output area so that marginal portions of some or all of said plural images are deleted by narrowing widths of said bands at ratios proportional to widths of said bands when said plural images can not be arranged in said output area in a vertical direction and narrowing widths of images existing in a band wherein an image which can not be arranged in a horizontal direction of said output area exists at ratios proportional to the widths of the images when said plural images can not be arranged in said output area in a horizontal direction; and
an image arranging step of determining an arrangement of said plural images on the basis of arrangement results at said first arranging step and said second arranging step.

21. An image arranging method according to claim 20, further comprising an area direction setting step of setting direction information of said output area,
wherein said first arranging step comprises a step of performing an arrangement of said images once again in a second direction different from a first direction set at said area direction setting step when a given image runs over said output area in an arrangement in said first direction, and
wherein said second arranging step comprises a step of arranging said plural images once again when a given image runs over said output area in an arrangement at said first arranging step.

22. An image arranging method according to claim 20, wherein said first arranging step comprises:
a step of arranging the images in a first direction set at said area direction setting step; and
a step of arranging the images in a second direction different from said first direction,
wherein said second arranging step comprises a step of acquiring a first runover quantity which is produced when said plural images can not be arranged in said output area in said first direction and a step of acquiring a second runover quantity when said plural images can not be arranged in said output area in said second direction, and
wherein said image arranging step comprises a step of determining an image arrangement in a direction corresponding to a runover quantity whichever is smaller.

23. An image arranging method according to claim 22, further comprising a step of consecutively adding images to be processed,
wherein said image arranging step comprises a step of excluding an image finally added at said image adding step when the first runover quantity or said second runover quantity whichever is smaller exceeds a definite ratio of said output area for the first time.

24. An image arranging method according to claim 20, further comprising a step of reducing said plural images to an image.

25. An image arranging method according to claim 20, further comprising a step of arranging said bands uniformly in said output area.

26. An image arranging method according to claim 20, further comprising a step of arranging said images uniformly in said bands.

27. An image processing method comprising:
  an image input step of inputting photographing images;
  a judgment stop of judging whether or not the plural images input in said image input step exceed an output area of a certain size;
  a deletion step of, in a case where it is judged in said judgment step that the plural images exceed the output area, deleting a predetermined area from the respective images; and
  an image arrangement step of arranging within the output area the images from which the predetermined area has been deleted in said deletion step.

28. A method according to claim 27, wherein the judgment in said judgment step is performed by comparing a sum of width lengths of the plural images and a width length of the output area.

29. A method according to claim 27, wherein the predetermined area is set based on an excess amount and image widths.

30. A method according to claim 29, wherein it is judged in said judgment step whether the excess amount exceeds a predetermined value.

31. A method according to claim 30, further comprising an image change step of, in a case where it is judged in said judgment step that the excess amount exceeds the predetermined value, changing the number of images.

32. An image processing apparatus comprising:
  image input means for inputting photographing images;
  judgment means for judging whether or not the plural images input by said image input means exceed an output area of a certain size;
  deletion means for, in a case where it is judged by said judgment means that the plural images exceed the output area, deleting a predetermined area by a deletion amount based on image width lengths exceeding the respective images; and
  image arrangement means for arranging within the output area the images from which the predetermined area has been deleted by said deletion means.

33. An apparatus according to claim 32, wherein the judgement by said judgement means is performed by comparing a sum of width lengths of the plural images and a width length of the output area.

34. An apparatus according to claim 32, wherein the predetermined area is set based on an excess amount and image widths.

35. An apparatus according to claim 34, wherein it is judged by said judgment means whether the excess amount exceeds a predetermined value.

36. An apparatus according to claim 35, further comprising image change means for, in a case where it is judged by said judgment means that the excess amount exceeds the predetermined value, changing the number of images.

* * * * *

UNITED STATES PATENT AND TRADEMARK OFFICE
CERTIFICATE OF CORRECTION

| | | |
|---|---|---|
| PATENT NO. | : 6,954,546 B2 | |
| APPLICATION NO. | : 09/729346 | |
| DATED | : October 11, 2005 | |
| INVENTOR(S) | : Tsukasa Sako | |

It is certified that error appears in the above-identified patent and that said Letters Patent is hereby corrected as shown below:

SHEET 1:
    FIG. 1, 126, "X-REY" should read --X-RAY--.

COLUMN 2:
    Line 25, "view point" should read --viewpoint--.

COLUMN 5:
    Line 50, "an" should be deleted.

COLUMN 7:
    Line 9, insert two spaces before "The";
    Line 15, insert two spaces before "FIG. 3";
    Line 17, insert two spaces before "When";
    Line 21, insert two spaces before "First,";
    Line 26, insert two spaces before "Then,";
    Line 29, insert two spaces before "Next,";
    Line 32, insert two spaces before "The";
    Line 37, insert two spaces before "When";
    Line 46, insert two spaces before "Then,";
    Line 52, insert two spaces before "Specific";
    Line 54, insert two spaces before "Step S201:";
    Line 55, insert two spaces before "First,"; and
    Line 60, insert two spaces before "To".

COLUMN 8:
    Line 1, insert two spaces before "Accordingly,".

COLUMN 10:
    Line 52, "perfumes" should read --performs--.

COLUMN 11:
    Line 56, "belong" should read --belonging--.

COLUMN 14:
    Line 15, "a result" should read --as a result--.

UNITED STATES PATENT AND TRADEMARK OFFICE
CERTIFICATE OF CORRECTION

PATENT NO.        : 6,954,546 B2
APPLICATION NO. : 09/729346
DATED             : October 11, 2005
INVENTOR(S)       : Tsukasa Sako It is certified that error appears in the above-identified patent and that said Letters Patent is hereby corrected as shown below:

<u>COLUMN 21</u>:
      Line 15, "stop" should read --step--.

Signed and Sealed this

Twenty-first Day of November, 2006

JON W. DUDAS
*Director of the United States Patent and Trademark Office*